(12) United States Patent
Westman et al.

(10) Patent No.: US 9,031,067 B2
(45) Date of Patent: May 12, 2015

(54) ROUTING MESSAGES

(71) Applicant: Nokia Corporation, Espoo (FI)

(72) Inventors: Ilkka Westman, Helsinki (FI); Lauri Laitinen, Espoo (FI); Ervin Beres, Espoo (FI); Gabor Bajko, Espoo (FI); Krisztian Kiss, Espoo (FI); Balazs Bertenyi, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/652,319

(22) Filed: Oct. 15, 2012

(65) Prior Publication Data

US 2013/0132593 A1 May 23, 2013

Related U.S. Application Data

(60) Continuation of application No. 12/779,924, filed on May 13, 2010, now Pat. No. 8,315,258, which is a division of application No. 10/521,772, filed as application No. PCT/IB2004/000546 on Feb. 19, 2004, now abandoned.

(60) Provisional application No. 60/447,754, filed on Feb. 19, 2003.

(51) Int. Cl.
  *H04L 12/28* (2006.01)
  *H04L 12/56* (2006.01)
  (Continued)

(52) U.S. Cl.
  CPC ............ *H04L 65/1066* (2013.01); *H04L 45/00* (2013.01); *H04L 47/00* (2013.01); *H04L 47/18* (2013.01); *H04L 45/74* (2013.01); *H04L 47/10* (2013.01); *H04L 45/72* (2013.01); *H04L 29/12113* (2013.01); *H04L 29/1216* (2013.01); *H04L 29/12594* (2013.01); *H04L 61/1541* (2013.01); *H04L 61/157* (2013.01); *H04L 61/3095* (2013.01); *H04W 8/02* (2013.01);
  (Continued)

(58) Field of Classification Search
  None
  See application file for complete search history.

(56) References Cited

U.S. PATENT DOCUMENTS 6,741,678 B2 * 5/2004 Cannell et al. ............. 379/88.14
6,788,676 B2   9/2004 Partanen et al.
(Continued)

FOREIGN PATENT DOCUMENTS

WO   WO-02/09365 A1   1/2002
WO   WO-02/43405 A1   5/2002
(Continued)

OTHER PUBLICATIONS

"Digital Cellular telecommunications system (Phase 2+); Universal Mobile Telecommunications System (UMTS); IP Multimedia Call Control Protocol based on SIP and SDP; Stage 2 (3GPP TS 23.218 version 5.3.0 Release 5); ETSI TS 123 218", Dec. 2002.
(Continued)

*Primary Examiner* — Phirin Sam
*Assistant Examiner* — Blanche Wong
(74) *Attorney, Agent, or Firm* — Mintz Levin Cohn Ferris Glovsky and Popeo, P.C.

(57) ABSTRACT

This invention relates to a method of routing for a message via an IMS system is disclosed. A message is received at an ICSCF. Address information is obtained for one of an application server, server or gateway for which said message is intended. The message is sent to said application server, server or gateway in accordance with said address information.

12 Claims, 17 Drawing Sheets

(51) Int. Cl.

| | | |
|---|---|---|
| *H04L 29/06* | (2006.01) | |
| *H04L 12/701* | (2013.01) | |
| *H04L 12/70* | (2013.01) | |
| *H04L 12/801* | (2013.01) | |
| *H04L 12/741* | (2013.01) | |
| *H04L 12/721* | (2013.01) | |
| *H04L 29/12* | (2006.01) | |
| *H04W 8/02* | (2009.01) | |
| *H04W 12/06* | (2009.01) | |
| *H04L 29/08* | (2006.01) | |
| *H04W 4/12* | (2009.01) | |
| *H04W 8/08* | (2009.01) | |
| *H04W 40/00* | (2009.01) | |
| *H04W 76/02* | (2009.01) | |
| *H04W 84/18* | (2009.01) | |

(52) U.S. Cl.
CPC .......... *H04W 12/06* (2013.01); *H04L 65/1006* (2013.01); *H04L 65/1016* (2013.01); *H04L 67/16* (2013.01); *H04L 67/14* (2013.01); *H04L 67/327* (2013.01); *H04L 69/327* (2013.01); *H04L 29/12188* (2013.01); *H04L 61/1588* (2013.01); *H04W 4/12* (2013.01); *H04W 8/08* (2013.01); *H04W 40/00* (2013.01); *H04W 76/022* (2013.01); *H04W 84/18* (2013.01)

(56) References Cited

U.S. PATENT DOCUMENTS

| | | | |
|---|---|---|---|
| 6,885,861 B2* | 4/2005 | Koskelainen | 455/414.2 |
| 7,181,537 B2 | 2/2007 | Costa-Requena et al. | |
| 7,440,744 B2* | 10/2008 | Muniere et al. | 455/403 |
| 7,769,374 B2 | 8/2010 | Phan-Anh et al. | |
| 7,974,295 B2 | 7/2011 | Tuohino et al. | |
| 2002/0027915 A1 | 3/2002 | Foti et al. | |
| 2002/0110104 A1 | 8/2002 | Surdila et al. | |
| 2002/0147845 A1 | 10/2002 | Sanchez-Herrero et al. | |
| 2002/0154755 A1 | 10/2002 | Gourraud | |
| 2002/0160776 A1 | 10/2002 | Torabi | |
| 2003/0026245 A1 | 2/2003 | Ejzak | |
| 2003/0027595 A1 | 2/2003 | Ejzak | |
| 2003/0041101 A1 | 2/2003 | Hansche et al. | |
| 2003/0108000 A1 | 6/2003 | Chaney et al. | |
| 2003/0159067 A1* | 8/2003 | Stirbu | 713/201 |
| 2004/0103157 A1* | 5/2004 | Requena et al. | 709/206 |
| 2004/0148416 A1 | 7/2004 | Aarnos et al. | |
| 2004/0205241 A1 | 10/2004 | Aarnos et al. | |

FOREIGN PATENT DOCUMENTS

| | | | |
|---|---|---|---|
| WO | WO-02/069128 A1 | 9/2002 | |
| WO | WO-02/082729 A1 | 10/2002 | |
| WO | WO-02/087265 A2 | 10/2002 | |
| WO | WO-02/096128 A2 | 11/2002 | |
| WO | WO-02/098157 A1 | 12/2002 | |
| WO | WO-03005669 A1 | 1/2003 | |

OTHER PUBLICATIONS

"Digital Cellular telecommunications system (Phase 2+); Universal Mobile Telecommunications System (UMTS); IP Multimedia Call Control Protocol based on SIP and SDP; Stage 3 (3GPP TS 24.229 version 5.3.0 Release 5); ETSI TS 124 229", Dec. 2002.

3GPP Draft; S2-012145, 3rd Generation Partnership Project (3GPP), "Routing IMS voice sessions to CS domain", Sep. 4, 2001.

3GPP Standard; 3GPP TS 23.228, 3rd Generation Partnership Project (3GPP), "3rd Generation Partnership Project; Technical Specification Group Services and System Aspects; IP Multimedia Subsystem (IMS); Stage 2 (Release 5)", Apr. 2001.

3GPP Standard; 3GPP TS 23.228, 3rd Generation Partnership Project (3GPP), "3rd Generation Partnership Project; Technical Specification Group Services and System Aspects; IP Multimedia Subsystem (IMS); Stage 2 (Release 6), v6.0.1", Jan. 1, 2003.

3GPP TR 23.841, V6.0.0, 3rd Generation Partnership Project; Technical Specification Group Services and System Aspects; Presence Service; Architecture and Functional Description; Release 6; Jul. 2002.

3GPP TR 24.841; V6.0.0; 3rd Generation Partnership Project; Technical Specification Group Core Network; Presence service based on Session Initiation Protocol (SIP); Functional models, information flows and protocol details; Release 6; Jun. 2004.

3GPP TS 23.002, V9.2.0, 3rd Generation Partnership Project; Technical Specification Group Services and Systems Aspects; Network Architecture; Release 9; Dec. 2009.

Examiner's Report No. 4 dated Feb. 25, 2010, issued by IP Australia, in connection with counterpart Australian application No. 2004214336.

MCC: 3GPP Draft; NP-020540, NP-020540, 3GPP Mobile Competence Centre; Nov. 27, 2002.

Official Action dated Jan. 26, 2010, issued by the Canadian Patent Office in connection with counterpart Canadian patent application No. 2,516,774.

Prabhas Sinha, "SIP Signaling in Mobile Electronic Transaction", Master's thesis submitted to the Graduate Faculty of North Carolina State University in partial fulfillment of the requirements for the Degree of Master of Science, section 5, pp. 24-33.

RFC 3261, SIP: Session Initiation Protocol, Jun. 2002.

RFC 3263, Session Initiation Protocol (SIP): Locating SIP Servers, Jun. 2002.

3GPP TR 23.922 V.1.0.0, 3GPP Technical Specification Group Services and Systems Aspects; Architecture for an All IP network, Oct. 31, 1999.

3GPP TS 23.228 V.5.0.0, 3GPP Technical Specification Group Services and System Aspects; IP Multimedia (IM) Subsystem—Stage 2, Apr. 30, 2001.

* cited by examiner

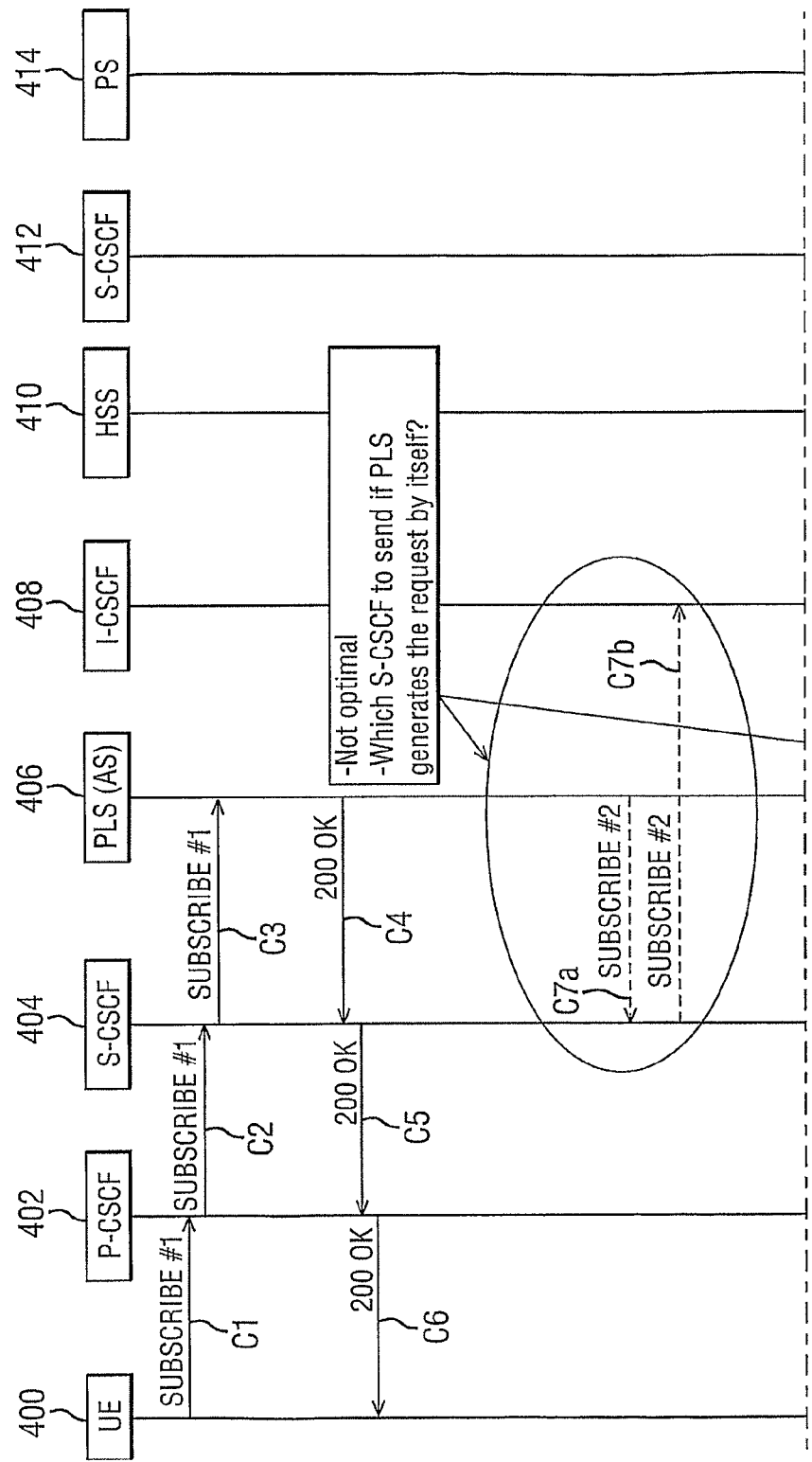

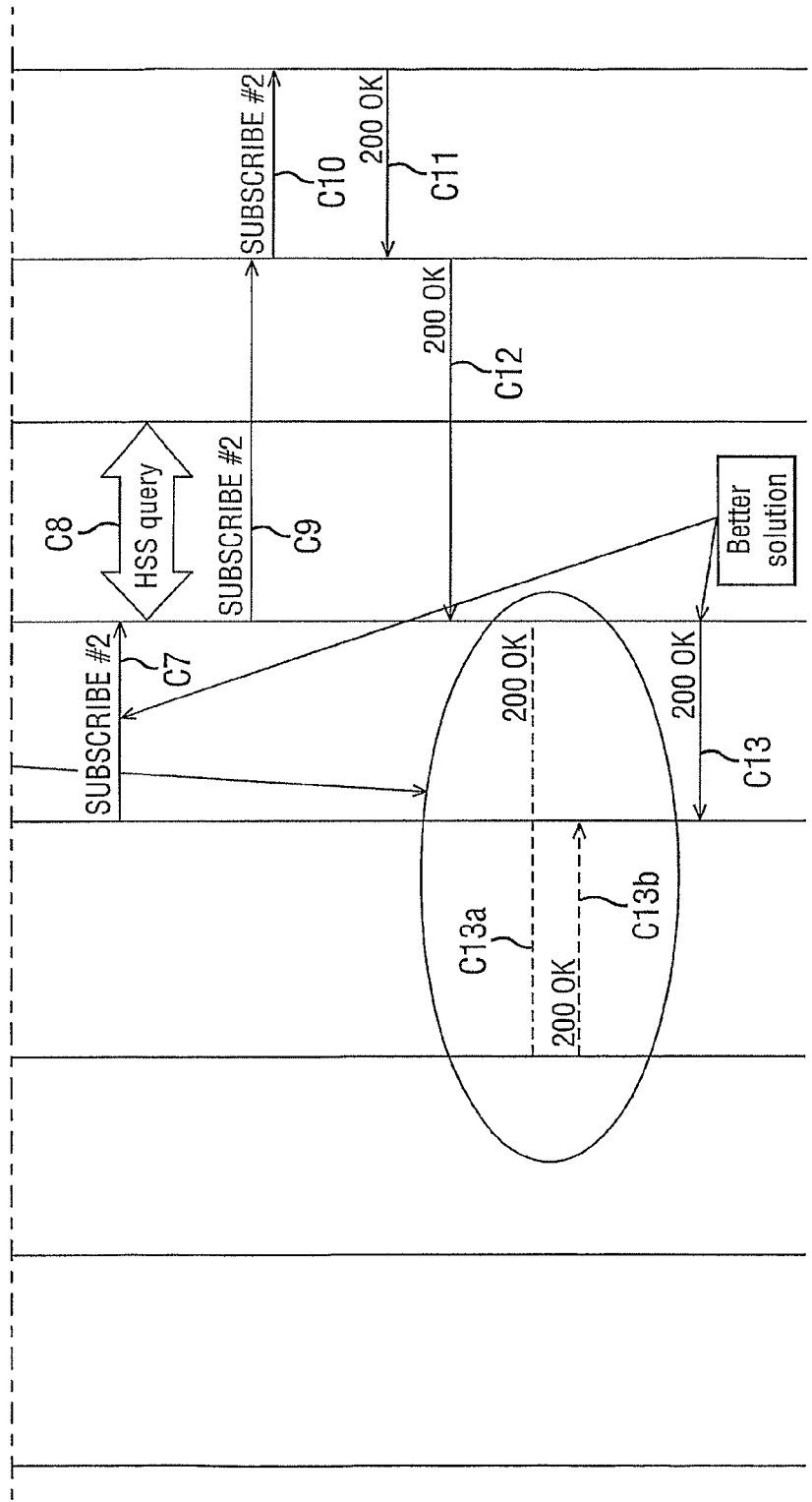
FIG. 4 (Contd.)

Invention 1:
PSI indication in AS originating PSI routing

ROUTING MESSAGES

CROSS REFERENCE TO RELATED APPLICATIONS

This application is a continuation application of U.S. patent application Ser. No. 12/779,924, filed May 13, 2010, and entitled "ROUTING MESSAGES", which is a divisional application of U.S. patent application Ser. No. 10/521,772, filed on Jan. 11, 2006, entitled "ROUTING MESSAGES," which claims the benefit under 35 U.S.C. §371 of PCT/IB2004/000546, filed Feb. 19, 2004, which claims priority to U.S. Provisional Patent Application Ser. No. 60/447,754, filed Feb. 19, 2003, United Kingdom Application No. 0306830.1, filed on Mar. 25, 2003, and United Kingdom Application No. 0315502.5, filed on Jul. 2, 2003. The contents of all of the aforementioned applications are hereby incorporated by reference in their entirety.

FIELD OF THE INVENTION

The present invention relates to the routing of messages, and in particular but not exclusively in an IMS system.

BACKGROUND TO THE INVENTION

The introduction of Third Generation (3G) communication systems will significantly increase the possibilities for accessing services on the Internet via mobile user equipment (UE) as well as other types of UE.

Various user equipment (UE) such as computers (fixed or portable), mobile telephones, personal data assistants or organisers and so on are known to the skilled person and can be used to access the Internet to obtain services. Mobile user equipment referred to as a mobile station (MS) can be defined as a means that is capable of communication via a wireless interface with another device such as a base station of a mobile telecommunication network or any other station. Such a mobile user equipment can be adapted for voice, text message, data communication or multimedia communication via the wireless interface.

The term "service" used above and hereinafter will be understood to broadly cover any service or goods which a user may desire, require or be provided with. The term also will be understood to cover the provision of complimentary services. In particular, but not exclusively, the term "service" will be understood to include Internet multimedia services, conferencing, telephony, gaming, rich call, presence, e-commerce and messaging e.g. instant messaging.

The 3G Partnership Project (3GPP) is defining a reference architecture for the Universal Mobile Telecommunication System (UMTS) core network which will provide the users of UE with access to these services. This UMTS core network is divided into three principal domains. These are the Circuit Switched domain, the Packet Switched domain and the Internet Protocol Multimedia (IM) domain.

The latter of these, the IM domain, makes sure that multimedia services are adequately managed. The IM domain supports the Session Initiation Protocol (SIP) as developed by the Internet Engineering Task Force (IETF).

SIP is an application layer signalling protocol for starting, changing and ending user sessions as well as for sending and receiving transactions. A session may, for example, be a two-way telephone call or multi-way conference session or connection between a user and an application server (AS). The establishment of these sessions enables a user to be provided with the above-mentioned services. One of the basic features of SIP is that the protocol enables personal mobility of a user using mobile UE by providing the capability to reach a called party (which can be an application server AS) via a single location independent address.

In this document the following abbreviations will be used:
AS Application Server
BGCF Breakout Gateway Control Function
CN Core Network
CPS Connection Processing Server
CS Circuit Switched
CSCF Call Session Control Function or Call State Control Function
DNS Domain Name System
ENUM See "E.164 number and DNS" (RFC2916)
FQDN Fully Qualified Domain Name
GW/S/AS network function or entity e.g. a proxy and/or Gateway and/or Server and/or Application Server or the like
HSS Home Subscriber Server
I-CSCF Interrogating CSCF
ID Identity
IM IP Multimedia
IMS IP Multimedia core network Subsystem
IMS-WV-GW Gateway between IMS and WV networks
IP Internet Protocol
ISC IP multimedia Service Control
MGCF Media Gateway Control Function
NAPTR Naming Authority Pointer (RFC 2915)
O-CSCF Outbound CSCF
P-CSCF Proxy CSCF
PMG Presence (P), Messaging (M) and Group Management (G)
PLS Presence List Server
PS Presence Server
PMG-WV-GW Gateway between IMS and WV networks
RR Resource Record of DNS
S-CSCF Serving CSCF
SIP Session Initiation Protocol (RFC 3261)
SIP URI SIP Uniform Resource Identifier (RFC 3261)
SLF Subscription Locator Function
SSR Service and Subscription Repository
TEL URL Is an URL associated to a terminal that can be contacted using the telephone network (RFC 2806)
UE User Equipment
UMS User Mobility Server
UMTS Universal Mobile Telecommunications System
URI Uniform Resource Identifier
URL Uniform Resource Locator
WV Wireless Village Terminating sessions/transactions are routed in an IMS from the I-CSCF to an S-CSCF that can route them to an AS following the rules of a filter criteria. If the target identity (i.e. public user identity) is not registered, the I-CSCF selects an S-CSCF, and the S-CSCF down loads filter criteria from the HSS. However there is a problem where the target identity is not an IMS identity—non-IMS identities are routed over the IMS network to a non-IMS network.

An AS originated session/transaction is routed in IMS from AS to an S-CSCF that can route them further. Normally this S-CSCF is the one that was used when the session/transaction was routed from S-CSCF to AS, or address of the S-CSCF that is returned from the HSS or other database as response to a query, or address of the (default) S-CSCF may be configured in AS or fetched from an internal or external database, table, list, configuration data storage or alike. There are cases where it is difficult or impossible to find an S-CSCF.

Here are some examples where it can be difficult to find a S-CSCF:

a) If the subscriber is not registered, possibly no S-CSCF is assigned to the subscriber (or more accurately to any public user identity of the subscriber).

b) If the sending network element is a service server that routes a session/transaction on behalf of the user, there is a similar situation i.e. there may be no S-CSCF assigned to the user. (This kind of service server is referred to as user dependent service server).

c) If a third party user uses a group identity as target address e.g. a message is sent to a group by a user that is not the "owner" of the group identity, there is a problem in deciding which S-CSCF should be used when the group server sends a message to each member of the group.

d) If the sender is a service that has no connection to any user (i.e. the sender is a user independent service server). At least in this case the AS has to choose an S-CSCF or use a default S-CSCF. Both solutions have drawbacks. In the first one the AS has to perform functionalities of I-CSCF i.e. choose an S-CSCF. In the second one (i.e. if the default is used), the problem is how the load is balanced (Round robin functionality in DNS may be used.)

An additional argument against routing through an S-CSCF is that no service of S-CSCF is needed e.g. no filter criteria is utilized. This is especially true in the user independent service server case.

Routing with service identities is another problem of IMS. In order to route to an AS, server, gateway, network function, network entity or alike that hosts or offers the service, an entry is needed in SLF and HSS containing routing information (e.g. filter criteria) for routing to S-CSCF and from S-CSCF to the correct AS, server, gateway, network function, network entity or the like that hosts or offers the service. The result is that HSS has to contain all service identities with proper routing information. There is a similar problem with group identities created by users. A user may for example create a group of work colleagues, a group of family and a group of friends. These identities with proper routing information have to be included in HSS. Service identities may be quite stable but the group identities may be changed relatively often. A group identity may be a list of users that can be used e.g. to send a message to all of them with a single message sending procedure (instead of repeating the procedure in order to send the same message to every one of them). The problem of using a service and group identity is the creation/modification/deletion of a more or less temporary entry in HSS in order to make the routing possible via an S-CSCF to a proper AS, server, gateway, network function, network entity or alike.

It has also been found that when a Presence List Server (PLS) subscribes to the presence information of presentities, the routing done according to the current 3GPP IMS standard is not optimal. In addition, when the PLS (AS) initiates a request by itself, it is not defined how the PLS (AS) selects an S-CSCF.

There exists a problem that if a group server is seen as an application server, an ISC interface should be used. This has the disadvantage that routing is complicated in that an S-CSCF is needed in both the terminating and originating cases.

Another problem is that in known arrangements, the application server has to store all used service identities into an SLF, an HSS and/or another subscriber database.

SUMMARY OF THE INVENTION

It is an aim of embodiments of the present invention to address one or more of the problems described.

According to one aspect of the invention, there is provided a method of routing for a message via an IMS system comprising the steps of receiving a message at an I-CSCF, obtaining address information for a network function for which said message is intended and sending said message to said network function accordance with said address information.

The network function may be provided by a network entity. The network function may be an application server, server, gateway or any other suitable entity.

Preferably, said message is sent directly or via a proxy or gateway element to the network function via a gateway element.

Preferably, said obtaining step comprises querying a database.

Preferably, said database comprises a SLF.

Preferably, said database provides said address information for said network function.

Preferably, said database provides information identifying a further database.

Preferably, said further database may comprise one of a HSS, UMS or SSR.

Preferably, said further database contains said address information.

Preferably, said further database contains configuration information of said network function.

Preferably, the method comprises the step of determining if said message is for an IMS target or a non-IMS target.

Preferably, said steps are followed only if it is determined that said message is not routed to any S-CSCF because the said message is for a non IMS target, or for an IMS target that identifies a service or a group or the like.

According to one aspect of the invention, there is provided, a method of routing a message from a network function via an IMS system comprising the steps of:
originating a message from a network function;
determining the address of a proxy entity to which said message is to be sent;
routing said message to said proxy entity; and
routing said message from said proxy entity to an entry point of a target network.

Preferably, said entry point is in the same or different network as said network function.

Preferably, wherein said originating step comprises originating one of a session and a transaction.

Preferably, said determining step comprises the step of querying one of a database, table, file and a list.

Preferably, said determining step comprises determining the proxy entity from information contained in said network function.

Preferably the method comprises the step of determining the entry point to which said message is to be routed.

Preferably, said proxy entity is arranged to determine the entry point to which said message is to be sent.

Preferably, said proxy entity is arranged to determine the I-CSCF to which said message is to be sent by accessing a database.

Preferably, said database comprises a DNS.

According to one aspect of the invention, there is provided a method of routing a message from a network function via an IMS system comprising the steps of originating a message from a network function determining the I-CSCF to which said message is to be sent, routing said message directly to said I-CSCF if said I-CSCF is in a same network as said network function.

According to one aspect of the invention, there is provided a method of routing a message from a network function via an IMS system comprising the steps of originating a message from a network function, determining the I-CSCF to which said message is to be sent, routing said message directly to said I-CSCF if said I-CSCF is in a trusted network.

According to one aspect of the invention, there is provided a method of routing a message from a network function via an IMS system, said method comprising the steps of sending a request from the network function to an I-CSCF, determining at the I-CSCF the S-CSCF to which a message from said network function is to be sent and sending said message to the determined S-CSCF.

Preferably, said network function comprises a PLS.

Preferably, said determining step comprises querying a database.

Preferably, said determining step comprises querying a HSS.

According to one aspect of the invention, there is provided a method of routing a message from a first network function via an IMS system, said method comprising the steps of sending a request from the first network function to an I-CSCF, determining at the I-CSCF a second network function to which a message from said first network function is to be sent and sending said message directly from the I-CSCF to said second network function.

According to one aspect of the invention, there is provided a method of routing a message comprising the steps of receiving a message in accordance with a first protocol, converting said message to a second protocol, querying a database using identification information in said message to obtain new identification information and using said new identification information to route the message to a proxy.

Preferably, said proxy is arranged to route said message.

Preferably, said proxy is arranged to obtain a translation of said identity.

Preferably, said proxy routes the message to another network.

Preferably, the proxy routes the message to an I-CSCF.

Preferably, an I-CSCF is arranged to query said database.

Preferably, said I-CSCF is arranged to route said message to said proxy.

Preferably, an entity receiving said message is arranged to route said message to said proxy.

Preferably, wherein said second protocol is SIP.

Preferably, said proxy is arranged to route said message to a gateway.

BRIEF DESCRIPTION OF FIGURES

For a better understanding of the present invention and as to how the same may be carried into effect, reference will be made by way of example only to the accompanying drawings in which:

FIG. 3a shows a known method of routing in an IMS system, where the session or transaction originates with the AS;

FIG. 3b shows a method embodying the present invention in an IMS system, where the session or transaction originates with the AS;

FIG. 4 shows a signal flow of a further embodiment of the invention;

DETAILED DESCRIPTION OF EMBODIMENTS OF THE INVENTION

Figure 1:
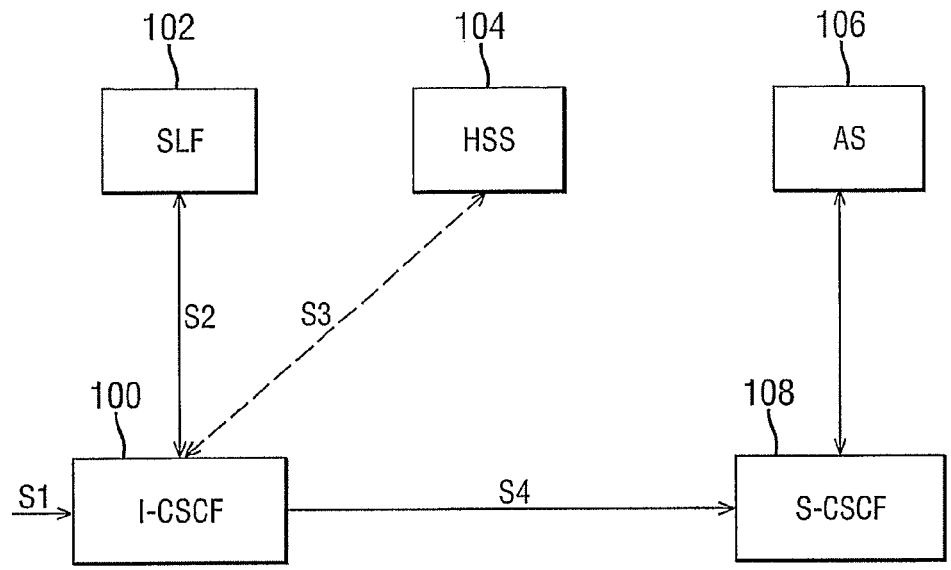
FIG. 1 shows a known method of normal terminating routing in an IMS system.

Embodiments of the present invention will be described in relation to a UMTS system in accordance with the so-called third generation standards. Reference is made to the following third generation partnership project standards which are hereby incorporated by reference. These documents describe the IP multimedia system to which embodiments of the present invention are particularly applicable. However the embodiments of the present invention are also applicable to any other type of SIP network, regardless of whether or not it is an IMS network as well as to non SIP networks which may or may not be IMS networks.

3GPP TS 23.002: "Network architecture".

3GPP TS 23.228: "IP multimedia subsystem; Stage 2".

3GPP TS 24.229: "IP Multimedia Call Control Protocol based on SIP and SDP; Stage 3"

3GPP 23.841 Presence Service; Architecture and Functional Description

3GPP 24.841 Presence based on SIP; Functional models, flows and protocol details Embodiments of the present invention may use SIP. In order to provide access to the Internet and other IM services to users, protocols have been developed to assist in providing telephony and multimedia services across the Internet. The session initiation protocol (SIP) is one such protocol which has been developed for controlling the creation, modification and termination of sessions with one or more parties. The call sessions may include e.g. Internet or other IP network telephone calls, conferences or other multimedia services and activities. The transactions may include e.g. Internet or other IP network messaging, presence, group, and other multimedia services and activities.

SIP addressing follows the popular Internet convention of identifying a user by a unique address using Uniform Resource Locators (URL's) or as defined in RFC3261 it is SIP URI. SIP signalling between two users consists of a series of requests and responses. A SIP transaction has dual parties, the user agent client (UAC) who sends a request and a user agent server (UAS) who responds in reply to the request. The client and server comprise the SIP user agent. In addition to this, SIP includes the SIP network server which is the network device/s which handle signalling associated with multiple calls.

As is known in the art an SIP invitation typically includes two messages. It will be understood that there may be more messages than only these and that, in fact, in 3GPP there are more messages used. These are not discussed herein for the sake of brevity. The two messages are an INVITE, initiated by the caller UAC and a 200 OK message from the callee. This latter message is typically acknowledged by the caller after which stage the parties may communicate according to parameters sent and received during signalling. Both the caller and callee can end a session by executing a BYE message. During an established session a new set of parameters may be selected by either participant producing a further INVITE message or by using some other SIP message.

In the following, references are made to application servers. In alternative embodiments, the application server may instead be a network function or entity e.g. a proxy or a gateway or a server or the like.

Embodiments of the invention aim to avoid finding a S-CSCF for sessions/transactions that do not need any actions or services offered by the S-CSCFs but only routing to/from a GW/S/AS i.e. a network function or entity e.g. a proxy and/or gateway and/or server and/or application server or the like. To do this routing is done directly from I-CSCF to a proper GW/S/AS with the help of SLF and/or HSS that returns address of the proper GW/S/AS. Embodiments of the invention can be applied at least to the following cases:
a) routing of non-IMS schemes via IMS network to a non-IMS network (e.g. WV scheme)
b) routing of generic schemes to a correct network: to IMS or to non-IMS (e.g. PRES—presence and IM instant message schemes)
c) routing of service and group identities to a proper GW/S/AS Generic schemes are protocol independent schemes specifying only the service but not the protocol. For example "IM" specifies the service to be "Instant Messaging" but not the used protocol that would e.g. be SIP in case of IMS. Respectively "pres" specifies the "Presence" service.

If non-IMS identities are not inserted into the SLF and/or HSS, it is possible to use for example pseudo entries in the SLF and/or HSS to handle the normal routing via the IMS network to an AS (i.e. from I-CSCF to S-CSCF (filter criteria) to AS). The filter criteria is needed in the S-CSCF to choose the correct AS to which to route the non-IMS identity. An example of routing non-IMS identities via an IMS to non-IMS network are Wireless Village (WV) identities that are routed from I-CSCF to an S-CSCF and further to an AS or server that acts as gateway e.g. IMS-WV-GW (or IMS Gateway) to WV network. These are discussed in more detail hereinafter.

Reference will now be made to FIG. 1 which shows how routing is currently carried out in known IMS systems with the signal flow indicated diagrammatically. At least some of the messages may be in accordance with the SIP (session initiated protocol). These messages are shown in capitals.

An I-CSCF 100 receives a message in step S1 such as an initial INVITE or MESSAGE.

The I-CSCF 100 then sends a query to the SLF 102 in step S2 and the SLF returns the address of the correct HSS 104. If there is only one HSS, SLF is not needed, and step S2 can be omitted.

In step S3, the I-CSCF 100 then sends a query to the identified HSS 104. The HSS 104 replies with the address of the correct S-CSCF 108 or the capabilities of a needed S-CSCF. If needed, the I-CSCF selects an S-CSCF.

In step S4, the I-CSCF 100 routes the message to the S-CSCF 108. The S-CSCF down loads routing information, (e.g. filter criteria for routing to application servers) if not yet downloaded.

In step S5, the S-CSCF 108 routes the message to the correct application server 106 using the downloaded routing information.

Figure 2A:
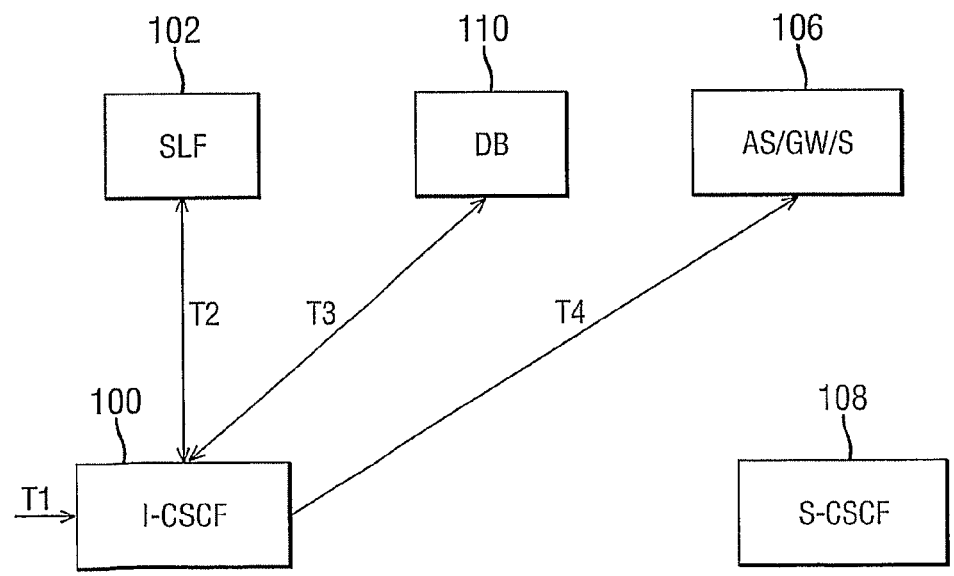
FIG. 2a shows a method embodying the present invention of routing in an IMS system.

Reference will now be made to FIG. 2a, which shows the routing used in a first embodiment of the invention. In particular, the routing of non-IMS schemes and service/group identities and dynamic identities is shown. It should be appreciated that in FIG. 2a, the routing of terminating sessions/transaction from the I-CSCF to the GW/S/AS are shown. The same reference numbers will be used for the same entities as shown in FIG. 1.

In step T1, the I-CSCF 100 receives a message such as initial INVITE or MESSAGE.

In step T2, the I-CSCF 102 makes a query to the SLF/HSS 102. The SLF/HSS returns the address of the correct GS/S/AS 106. Optionally, the SLF/HSS 102 may return the address of the database or server such as a HSS, UMS user mobility server or SSR subscriber service router or repository or database containing dynamic public user identities or database containing dynamic service identities or other database. SLF/HSS denotes SLF, or HSS in the case there is no SLF.

In step T3, the I-CSCF 102 will optionally make a query to the database 110 identified in step T2. It should be noted that the SLF may have returned the actual address of the database or its configuration information or the like. The database will return the address of the correct GW/S/AS 106.

In step T4, the I-CSCF 100 routes the message to the correct GW/S/AS using the address returned by the SLF/HSS, if provided, or if not from the database 110.

Non-IMS schemes are other schemes than those associated with the user, group or service identities of IMS i.e. currently "sip" and "tel", which are also the originally used schemes in IMS. "Non-IMS scheme" is used in embodiments of the invention to refer to schemes which are not currently IMS schemes. As the standard evolve, it is of course possible that a current so-called non-IMS scheme may become an IMS scheme. If a non-IMS scheme becomes an IMS scheme, embodiments of the invention may still apply.

In embodiments of the invention, the following may be done:
1. Routing to the target IMS network with non-IMS scheme is done normally only if the target operator allows it to be done.
2. Routing via the target IMS network to WV network is done by routing directly from I-CSCF to PMG-WV-GW or any other IMS gateway because non-IMS subscriber has
   normally no entry in HSS
   no filter criteria
   nothing to do with IMS
   IMS is thus only a routing path to WV network 3. No fallback if faulty scheme
   Normally error is returned to UE
   IMS does not normally correct the faulty scheme
4. wv: +3584022334455@domain,
   im: +3584022334455@domain,
   pres: +3584022334455@domain,
   sip: +3584022334455@domain
   are valid WV routable identities.
      wv: +3584022334455 is valid WV identity in the domain in question When non-IMS scheme is present, it is normally checked whether the target operator will receive the message via SIP. To do this, e.g. a DNS query is made with target domain name. It is asked for SRV records e.g. with _im._sip.operator.net. The answer might be e.g. _im._sip.operator.net SRV 0 0 5060 i-cscf.operator.net.

This answer indicates that "im" scheme is accepted with SIP protocol in the port 5060 of the address "i-cscf.operator.net".

The target operator may or may not allow messages using a non-IMS scheme. If the target operator allows the non-IMS scheme, a routable address is found with DNS query and the message will be routed to that address. The scheme is not normally modified.

If the target operator will not receive the non-IMS scheme, that is no routable address is found with DNS query, the message will be routed to the appropriate GW/S/AS e.g. PMG-WV-GW or IMS gateway. The filter criteria are not used to find the correct GW/S/AS and the address of GW/S/AS is configured in S-CSCF or is fetched from a table, list or database or the like. This can be done using for example a routing table as follows:

| schema | target |
|--------|--------|
| wv | pmg-wv-gw.home.net |
| pres | pmg-wv-gw.home.net |
| im | pmg-wv-gw.home.net |

When a non-IMS scheme is present, it is checked whether the message should be routed to a S-CSCF e.g. because the target identity is an IMS identity. The I-CSCF makes a SLF and/or HSS query. The scheme may or may not be carried over Cx and Dx interfaces (standardized). There may be different ranges for different schemes or the schemes may be marked somehow inside the subscriber data.

If the message should be routed to a S-CSCF for example the identity is found to be an IMS identity in the SLF/HSS, the schema is handled according to the general principles of IMS and routing is as normal terminating case in IMS.

If the message should not be routed to a S-CSCF for example the identity is not found to be an IMS identity in SLF/HSS, the I-CSCF finds the correct GW/S/AS where the message is routed. The GW/S/AS address is returned from SLF/HSS or the address of GW/S/AS is configured in I-CSCF. No S-CSCF is involved. There may be a new interface between I-CSCF and GW/S/AS e.g. PMG-WV-GW or other IMS gateway.

Routing to WV is possible via target IMS domain.

Figure 2B:
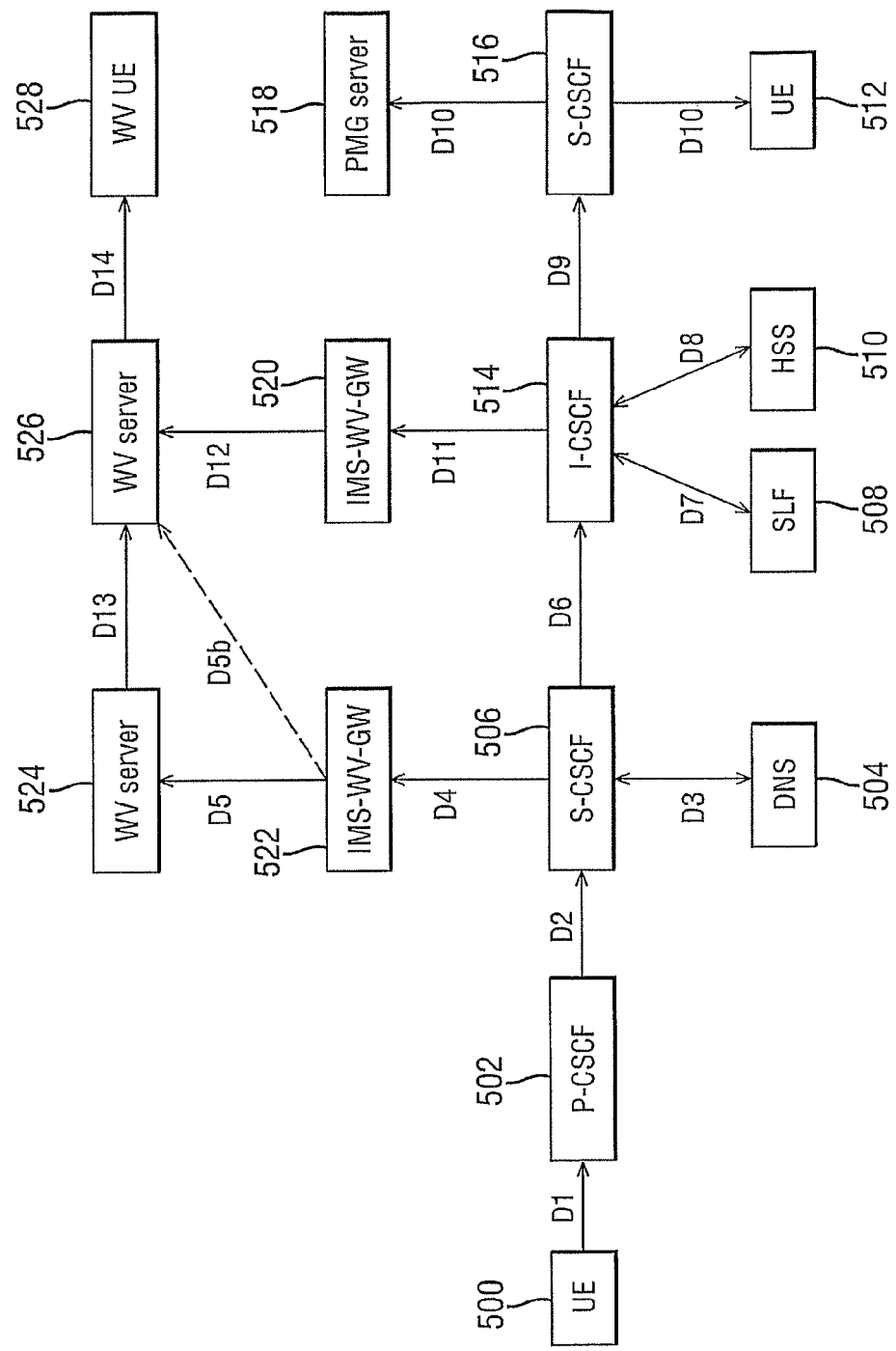
FIG. 2b shows schematically routing with non-IMS schemes.
Figure 2C:
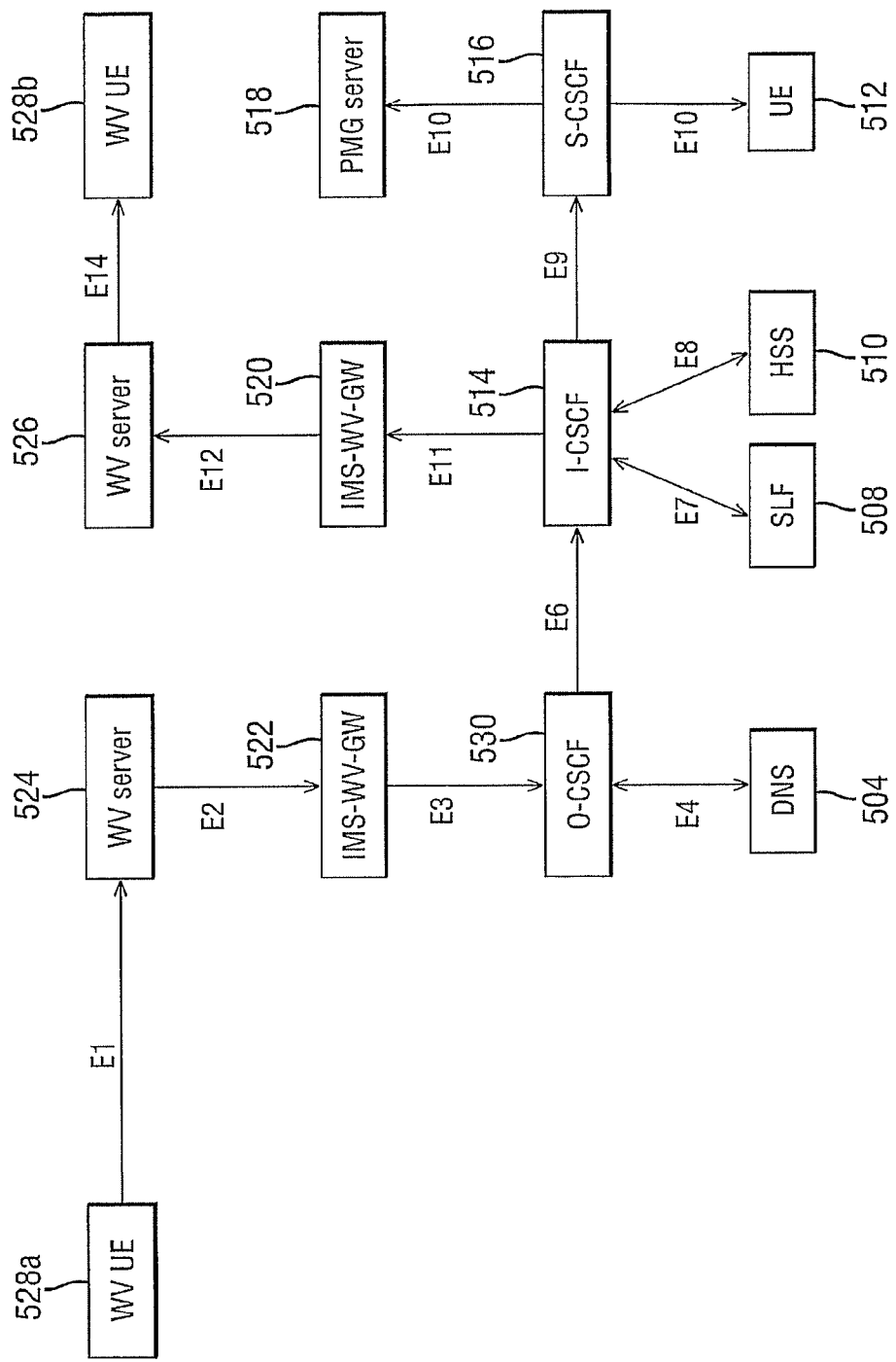
FIG. 2c shows schematically routing from WV user equipment.
Figure 2D:
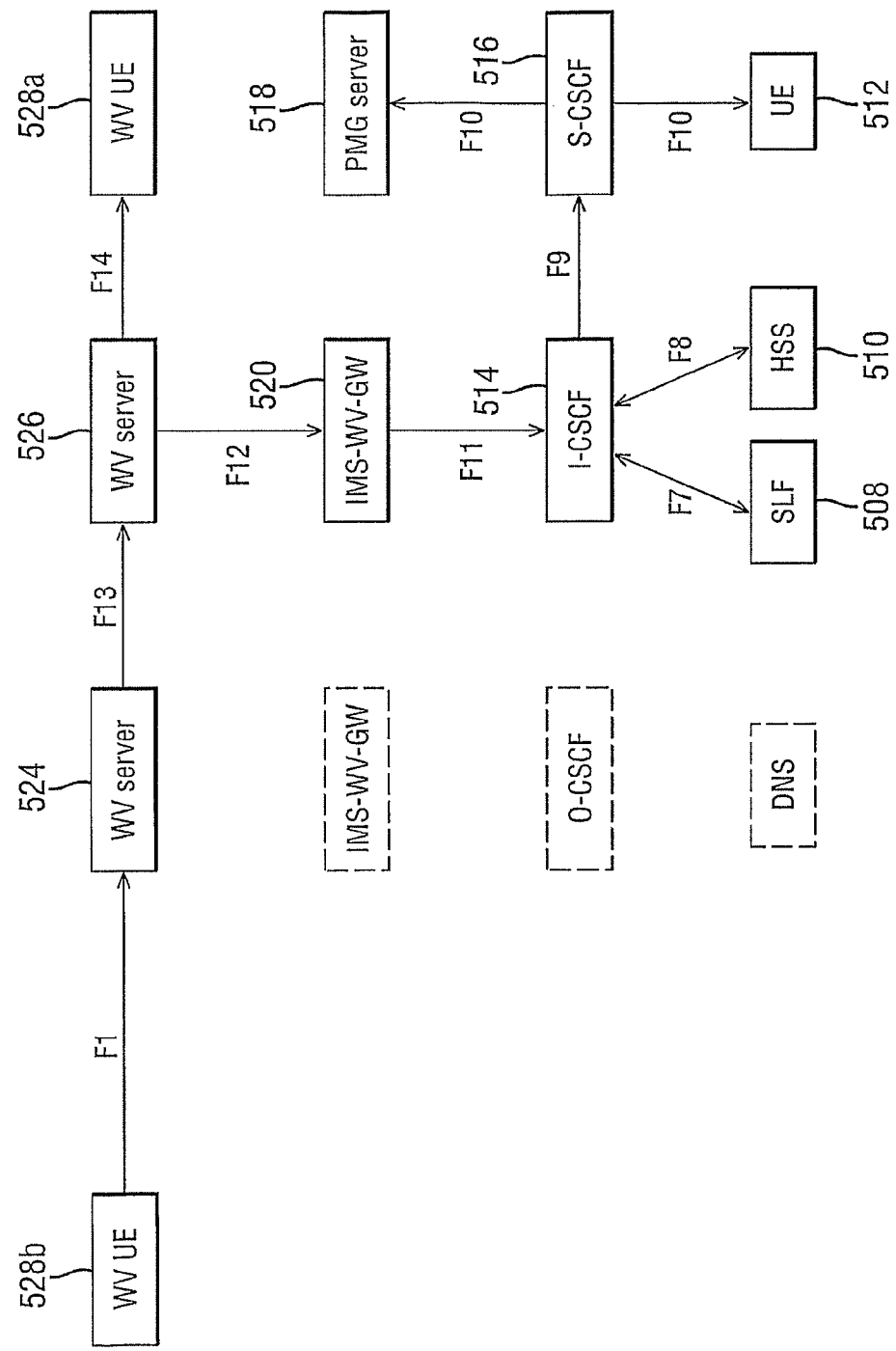
FIG. 2d shows routing from WV domain to either WV or IMS domain.

Reference is made to FIGS. 2b to 2d which illustrate the above-described scenario. Referring first to FIG. 2b:

This is where there is an IMS ID. From the user equipment 500 a message is sent in step D1 to the P-CSCF 502 which in turn sends a message in step D2 to the S-CSCF 506. Next, the S-CSCF makes a query with the DNS 504 in step D3. In response to that query, the S-CSCF sends a message in step D6 to the I-CSCF 514. The I-CSCF 514 sends message in step D7 to the SLF 508 and receives a reply. In the next step, the I-CSCF sends a message to the HSS and receives a reply in step D8. In step D9, the I-CSCF 514 sends a message to S-CSCF 516. The steps D7 to D9 are as described earlier as steps S2 to S4 in relation to FIG. 1.

Where there is a non-IMS ID, the following steps occur: in particular, steps D1, D2, D3, D6, D7 and optionally D8 are as described when there is an IMS identity. The next step however is step D11 where the I-CSCF 514 contacts the second PMG-WV-GW or IMS gateway 520. The second IMS gateway 520 sends a message to a second WV server 526 in step D12. In step D14, the WV server 526 sends a message to WV user equipment 528.

Where routing is not possible via the target IMS, the route taken is the same as steps D1 to D3 already described. However, the next step is then D4 where the S-CSCF 506 sends a message to the first IMS gateway 522. The next step may either be step D5 or D5b. In step D5, a message is sent to a first WV server 524 which contacts the second WV server 526 in step D13. A message is sent in step D5b directly from the IMS gateway 522 to the second WV server 526. In both cases the next step will be step D14 where the second WV server sends a message to the WV user equipment 528.

It should be appreciated that the gateway entities 522, 520 and PMG 518 can all be regarded as proxies or servers, and for example application servers.

Reference is made to FIG. 2C which shows where the routing from the WV server is configurable (based on the scheme and/or domain). Normally, routing via the WV is the first choice and routing to the IMS is the second choice. However, this may be reversed in some embodiments of the present invention.

Routing to the WV may be via the target IMS domain. This is a result of the DNS query at the outbound proxy O-CSCF. Routing after the outbound proxy is the same as described in relation to FIG. 2b. Those elements, which are the same in FIG. 2b, are marked with the same reference numbers.

Where there is a routable URI, that is routing is possible via the target IMS, there are two options. The first one is where there is an IMS ID. In this case, routing from the first WV user equipment 528a is then to the first WV server 524 in step E1. The first WV server 524 sends a message in step E2 to the first IMS gateway 522 which in turns sends a message in step E3 to the O-CSCF 530. The O-CSCF 530 sends a message in step E4 to the DNS 504. In response to the information received from DNS 504, the O-CSCF 530 sends a message in step E6 to the I-CSCF 516. The I-CSCF 516 obtains information from the SLF 508 in step E7 and information from the HSS 510 in step E8. E8 may also be an alternative to step E7 if there is no SLF. Next, the I-CSCF contacts in step E9 the S-CSCF 516 identified by steps E7 and/or E8.

Where there is a non IMS ID, steps E1, E2, E3, E4, E6 and E7 are performed as described in relation to the IMS ID. Step E8 is optional and/or an alternative to step E7 if there is no SLF. The next step is then step E11 where the I-CSCF 516 contacts second IMS gateway 520. In step E12, the second IMS gateway 520 contacts the second WV server 526. In step E14, the second WV server 526 contacts the second WV user equipment 528b.

Where routing is not possible via the target IMS, the steps taken would be steps E1, E2, E3 and E4. At that point, an error would be returned to WV server 524 that may for example try to route to the target WV server 526.

Again, the first and second IMS gateways 522 and 520 as well as PMG server 518 may be proxies or servers, for example application servers.

Reference is made to FIG. 2d which illustrates routing to WV/IMS via the WV domain. Again, the same reference numerals are used for the same entities. At the target WV server 526, it is checked whether the user is a WV user. Where the user is a non WV user the following steps occur. Firstly, in step F1, a message is sent from the source WV user equipment 528b to the first WV server 524. The first WV server 524 sends a message in step F13 to the second WV server 526. The second WV server 526 sends a message in step F12 to the second IMS gateway 520 which in turn sends a message to the I-CSCF 514 in step F11. The I-CSCF obtains information from the SLF 508 in step F7 and information from HSS 510 in step F8 as previously described.

Next, in step F9, the I-CSCF 514 sends a message in step F9 to the S-CSCF 516. The S-CSCF 516 sends a message in step F10 to the user equipment 512 or the PMG server 518.

Where a WV user 528a is the target user, a much simpler routing occurs. The WV user equipment, which is the source, 528b, sends a message in step F1 to the first WV server 524 which then sends a message in step F13 to the second WV server 526. The second WV server 526 in step F14 sends a message to the WV user equipment which is the target, that is WV UE 528a.

Loop detection is needed in the I-CSCF or in the IMS gateway or WV server routes to IMS gateway only messages with target identities of IMS or the IMS gateway changes the scheme to SIP to prevent further routing back to the WV network.

An example will now be given of information stored in the SLF in one embodiment of the invention:

An entry in SLF may contain e.g. the following information:
a) Usual IMS entry to refer to the proper HSS:
john.smith@operator.net reference to HSS_3
b) John Smith has also WV subscription. WV traffic is routed to WV network through the gateway IMS-WV-GW:
wv:john.smith@operator.net reference to IMS-WV-GW
c) John Smith wants to receive Instant messages in WV network:
im:john.smith@operator.net reference to IMS-WV-GW
d) John Smith wants to offer his Presence information from IMS network:
pres:john.smith@operator.net reference to HSS_3
e) John Smith has created a group (consisting of his fishing friends) to be used e.g. with message services. For example anyone can send an Instant message to the whole group by sending it to the group identity:
fishingfriends.john.smith@operator.net reference to group_server The entry to offer movie services also to customers from other networks might contain the following information:
movies@operator.net reference to movie server These are only examples of information. References to a HSS and to a gateway or server must differ in order that the I-CSCF is able to act accordingly: to make HSS query to the indicated HSS or to route the message to the indicated gateway or server respectively.

Embodiments of the invention avoid allocating an S-CSCF to route non-IMS identities over the IMS to non-IMS networks.

Advantages of the embodiments of the invention are:
a) No big influence on HSS because no filter criteria is needed.
b) No need to allocate an S-CSCF i.e. saves resources.
c) No influence on S-CSCF i.e. no need to have special scenarios for handling non-IMS identities.

d) SLF can contain all non-IMS identities or as on option a pseudo entry only for one or more groups of the non-IMS identities.
e) Operator can offer service to its IMS customers to prioritize IMS or non-IMS services e.g. presence service is offered from the WV network (when the IMS subscriber also has WV subscription).
f) Group names and service names can be routed directly to the correct GW/S/AS. They need no entry in HSS.
g) Routing to several GW/S/ASs is difficult. To solve the problems discussed above, routing to one GW/S/AS is enough. Of course the SLF may return several addresses if needed. These could be tried one after another until a GW/S/AS is found that accepts the message. These addresses could also be used as a route through several GW/S/ASs.

Scheme can be "visible" in SLF and/or in HSS i.e. it is part of the key that is used to identify entries in SLF and/or in HSS or every public user identity entry in SLF and/or in HSS indicates what are the valid schemes with that public user identity.

A second embodiment of the present invention will now be described with reference to FIGS. 3a and 3b.

In order to avoid finding a S-CSCF for a session/transaction, where no S-CSCF is allocated or it is difficult to find out the address of the allocated S-CSCF, the session/transaction is routed from the GW/S/AS to an O-CSCF i.e. outbound proxy. From O-CSCF i.e. outbound proxy the session/transaction is routed further to I-CSCF of the target network.

The O-CSCF i.e. the outbound proxy may be bypassed when the target network is the same network i.e. the target I-CSCF is located in the same network or in a trusted network. In this case session/transaction is routed directly from GW/S/AS to the I-CSCF.

This embodiment of invention can be applied at least to the following cases:
a) routing from GW/S/AS (e.g. from IMS WV gateway) non-IMS traffic (e.g. with WV scheme) via IMS network to another IMS network
b) routing from GW/S/AS sessions/transactions where the originator (e.g. service group server) is loosely or not at all connected to any subscriber; (in this case GW/S/AS is referred as user independent service server)

GW/S/AS may start the session/transaction or GW/S/AS may be a gateway passing traffic to IMS network. Both cases are referred here as GW/S/AS originated sessions/transactions.

In embodiments of the invention, the address or the name of the GW/S/AS, O-CSCF (i.e. outbound proxy) and I-CSCF may be configured in GW/S/AS. Addresses or names may also be fetched from a database (e.g. DNS), table, file, server or the like. The addresses and names may be resolved e.g. with database (e.g. DNS), table, file, server or the like.

In general in all embodiments the addresses and/or names of the functions, gateways, servers, elements and the other entities of a network may be resolved e.g. with database (e.g. DNS), table, file, server or the like.

The O-CSCF is a logical functionality that may be implemented with I-CSCF in the same network element. Alternatively, the functionality of the I-CSCF may be changed so that it includes the functionality of the O-CSCF.

This embodiment is concerned with avoiding finding and/or allocating an S-CSCF to route GW/S/AS originated sessions/transactions.

Figure 3A:
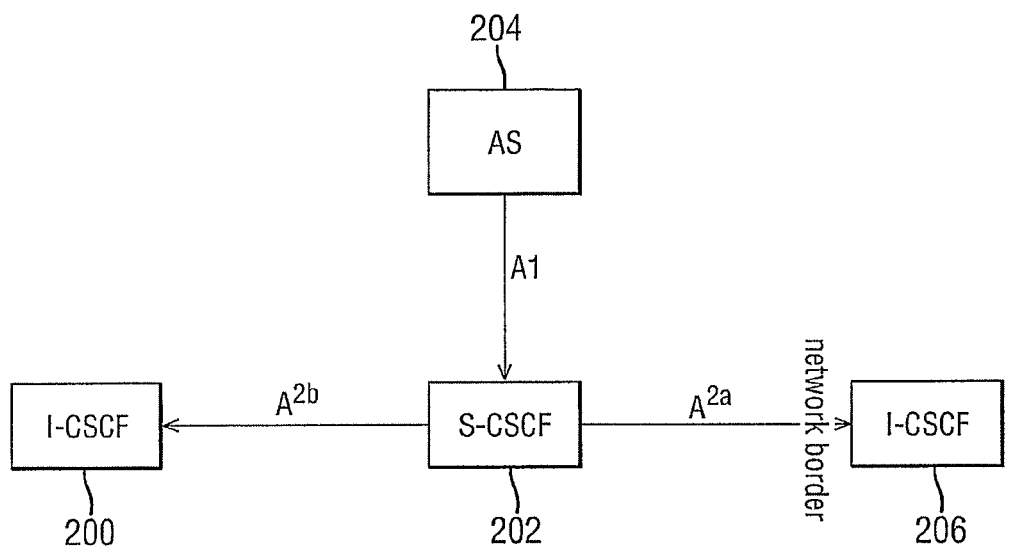

Reference will now be made to FIG. 3a which shows known routing in an IMS system.

In step A1, the GW/S/AS 204 originates a session or transaction. The session or transaction is routed to a S-CSCF 202.

The address of the S-CSCF may be known from the previous session or transaction or it may be queried from the HSS or it may be configured in the GW/S/AS. Possibly the filter criteria are evaluated and the session or transaction may be routed to an AS according to the filter criteria.

The next step is either step A2a or A2b. In step A2b, the session or transaction is routed to an I-CSCF 200 in the same network as the S-CSCF. In step A2a, the session or transaction is routed to an I-CSCF 206 in a different network to the S-CSCF 202.

Figure 3B:
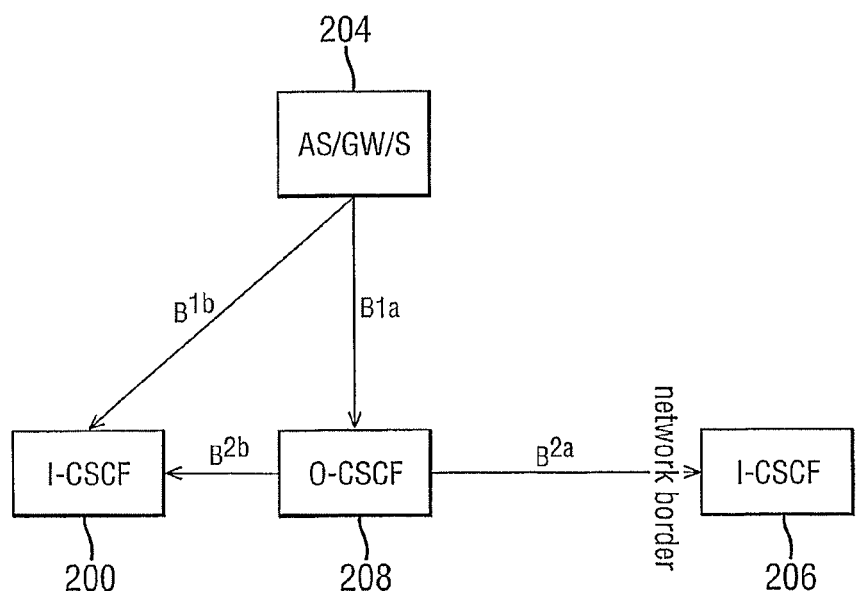

Reference is now made to FIG. 3b, which illustrates a second embodiment of the invention. In particular, the routing of non-IMS identities and routing of cases with IMS service/group identity as an originator is shown. It should be appreciated that in FIG. 3b, the routing of originating sessions/transaction from the GW/S/AS to the O-CSCF (i.e. outbound proxy) are shown.

O-CSCF is an outbound proxy that may be like S-CSCF without subscriber database, because the O-CSCF normally does not need to perform any activities associated to IMS subscribers. O-CSCF may have all other features of the S-CSCF.

In step B1a, the AS 204 originates a session or transaction. The session or transaction is routed to O-CSCF 208. The address of the O-CSCF is queried from a database or the like or is fetched from a table, a file, a list or the like or is configured in the GW/S/AS.

Step B1b is an optional step and allows optimal routing from the GW/S/AS 204 directly to the I-CSCF 200 if the I-CSCF is located in the same network or in a trusted network.

The next step is either step B2a or B2b. In step B2b, the O-CSCF routes the session or transaction to a I-CSCF 200 in the same network whilst in step B2a, the O-CSCF 208 routes the session or transaction to an I-CSCF 206 in another network.

Advantages of this second embodiment of the invention are:
a) No influence on HSS, because there is no need to insert service/group identities (and possibly also filter criteria) to SLF and/or HSS in order to be able to allocate an S-CSCF when a GW/S/AS originates a session/transaction on behalf of a service/group identity.
b) No need to allocate an S-CSCF i.e. saves resources.
c) No influence on S-CSCF. No scenarios needed to align Subscriber Profile Database (SPD) to handle these cases.
d) Sessions/transactions on behalf of service/group identities can be routed directly from GW/S/AS to O-CSCF without passing any S-CSCF.
e) The solution can be seen as a second (GW/S/AS to I-CSCF in the own network) and a third (GW/S/AS to O-CSCF) possibility to route GW/S/AS originated sessions/transactions. The first possibility is to route via S-CSCF if the S-CSCF can easily be used.

When the Presence List Server (PLS) terminates some request and it triggers a new request or some request is initiated by the PLS, in the current 3GPP IMS architecture the PLS needs to send the request to an S-CSCF. This can be done based on the Record-Route header of the received request (if there was one) or the PLS can have the S-CSCF configured. In a better solution, the PLS can directly send the message to an I-CSCF and leave out the S-CSCF as in case of PLS (group) there are no originating services.

Public service URIs (i.e. URIs that are identities of services or alike) and group URIs (i.e. URIs that are identities of groups or alike) can be routed according to the embodiments of this invention. In the first embodiment (i.e. in case where routing from I-CSCF to GW/S/AS) the SLF/HSS may return name or address of the GW/S/AS similarly as it does in cases where routing with an non-IMS identity according to the embodiment. In the second embodiment (i.e. GW/S/AS originated case) the messages with a service URI or a group URI as an originator are routed to O-CSCF similarly as messages with non-IMS identity as an originator according to the embodiment.

Reference will now be made to FIG. 4 to describe a further embodiment of the invention. Current 3GPP architecture requires unnecessary involving of the S-CSCF where the S-CSCF selection is problematic or not optimal.

The advantage of embodiments of the invention is that this solution works in all cases and is simpler than the one that follows the current 3GPP PMG architecture.

FIG. 4 shows the messages in embodiments of the invention. This can be summarised as follows:
Watcher agent in a UE subscribes to a presence list (SUBSCRIBE #1 from UE-till PLS).
The request is answered (200 OK from PLS to UE).
PLS initiates a subscription to one of the presentities belonging to the list (SUBSCRIBE #2 PLS till PS).
This can be sent through the S-CSCF or as proposed in embodiment of this invention, it can be directly sent to the I-CSCF
The answer to the subscription is routed back from PS to PLS Reference is made to FIG. 4 which shows the signal flow in the third embodiment of the present invention. In step C1, a subscribe message is sent from the user equipment 400 to the P-CSCF 402. In step C2 the subscribe message is sent from the P-CSCF 402 to the S-CSCF 404. In step C3 the subscribed message is sent from the S-CSCF 404 to the PLS(AS) 406. The PLS(AS) sends in step C4 a 200 OK message (which is a SIP acknowledgement message) back to the S-CSCF 404. In step C5, the S-CSCF 404 sends the 200 OK message to the P-CSCF 402. The P-CSCF 402 sends the 200 OK message in step C6 to the user equipment 400. The flow shown in FIG. 4 now shows two options.

The optimal signal flow will now be described as followed. The next step is for a prescribed message to be sent in step C7 from the PLS (AS) 406 to the I-CSCF 408. In step C8, there is a HSS query where the I-CSCF 408 sends a query to the HSS 410 and receives a reply. The HSS will return the correct S-CSCF or the capabilities of a needed S-CSCF.

In the next step C9 a second subscribe message is sent from the I-CSCF 408 to the S-CSCF 412. The S-CSCF will send the subscribe message to the PS 414 in step C10. The presence server 414 sends an acknowledgement message such as a 200 OK message in step C11 to the S-CSCF 412. The S-CSCF 412 sends in step C12 a 200 OK message to the I-CSCF 408. Finally, the I-CSCF 408 sends a message in step C13 to the PLS (AS) in step C13. This message is the 200 OK message.

In a less optimal solution, step C7 is replaced by steps C7a and C7b. In those steps, the PLS (AS) 406 sends the second subscribe message first to the S-CSCF 404 in step C7a. In step C7b, the S-CSCF 404 sends the subscribe message to the I-CSCF 408. Additionally, step C13 is replaced by steps C13a and step C13b in this less optimal solution. In this less optimal solution, the I-CSCF 408 sends the 200 OK message in step C13a to the S-CSCF 404. In step C13b, the S-CSCF 404 sends the 200 OK message to the PLS (AS). This second solution is less optimal in that it is not clear to which S-CSCF to send the messages if the PLS generates the request by itself.

The implementation is simple, as the PLS (defined in 3GPP to be an AS) need to send the PLS originated requests to the I-CSCF instead of the S-CSCF.

Reference is now made to FIGS. 5a to 5d which show arrangements in which the outbound proxy is utilised to get a more optimal routing in the case of number portability. The outbound proxy has the capability to act as a CSCF without subscriber profile database i.e. it does not handle subscribers and thus no filter criteria connected to any subscriber are down loaded from subscriber database e.g. HSS. The outbound proxy, which is here called outbound CSCF i.e. O-CSCF, is capable of making the ENUM translation. It can also route to similarly as a S-CSCF. The O-CSCF can be used to solve number portability routing problem with proposed solution where MGCF should route directly to another network; and I-CSCF routes directly to an I-CSCF in another network.

In embodiments of the invention, the MGCF routes the session/transaction (with the new identity returned from number portability database e.g. SLF) to an O-CSCF. The O-CSCF checks the identity to see whether ENUM translation is needed. If it is, the O-CSCF performs the translation. In short the O-CSCF does all the same procedures as S-CSCF when it routes session/transaction to another network. The main difference between S-CSCF and O-CSCF is the usage. S-CSCF is used when there exists a user in the same network who can be linked to the session/transaction; while O-CSCF is used when such a user cannot be found. In the CS originated case the calling party is not a subscriber of the IMS network. Because the target number is ported to another network neither is the called party is a subscriber of the network. Thus with using O-CSCF it is possible to avoid routing through S-CSCF, and also to avoid adding new functionalities to MGCF in order to make it capable of routing directly to another network.

One modification is to let the I-CSCF route the session/transaction directly to O-CSCF instead of MGCF routing to O-CSCF. The decision procedure in I-CSCF is simple: because the new identity (after the number portability procedure) is not identity of this network, the session/transaction has to be routed out of this network to the target network. Thus routing to an O-CSCF is an evident choice. No S-CSCF can be naturally chosen, because the new identity is not linked to any identity that could be registered in this network.

The same solution can be applied also to cases where number portability procedure is done in the terminating network and the session/transaction is received from another IMS network.

Figure 5A:
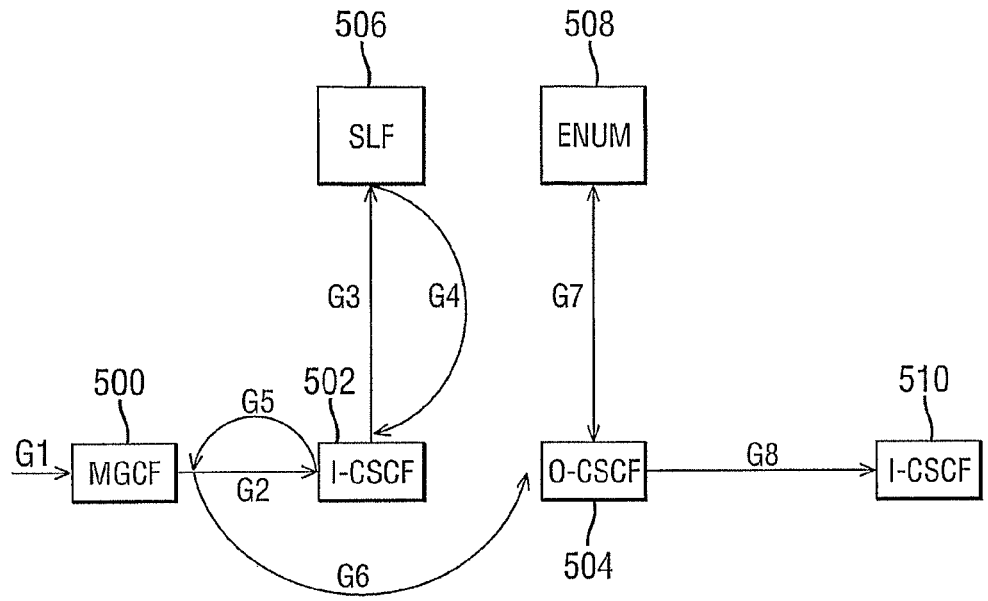
FIG. 5a shows a first arrangement where routing is done with an O-CSCF.
Figure 5B:
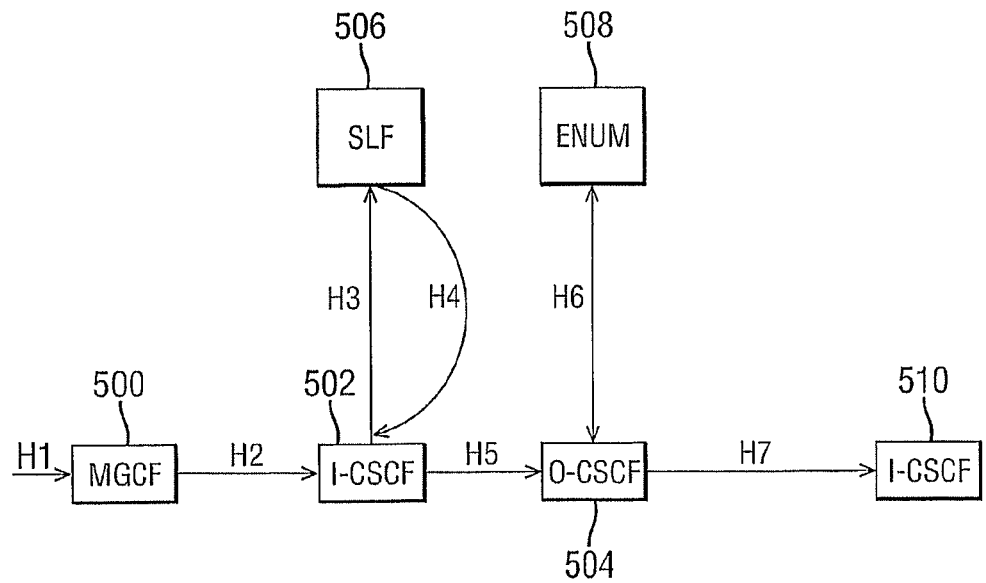
FIG. 5b shows a second arrangement where routing is done with an O-CSCF.

In FIGS. 5a and 5b, porting to the IMS domain is illustrated.

The MGCF 500 receives a message from CS that is a call set up message in step G1. The MGCF 500 converts the message to a SIP message to for example and initial INVITE message.

In step G2, the MGCF 500 sends the message to the I-CSCF 502 in the same network which receives that message.

In step G3, the I-CSCF 502 makes a query to a number portability database such as SLF 506 with the target number of the initial INVITE message.

In step G4, the SLF 504 returns the new identity.

In step G5, the I-CSCF 502 returns e.g. the "301 moved permanently" response to the MGCF 500.

In step G6, the MGCF reroutes the message to the O-CSCF 504.

In step G7, the O-CSCF 504 makes an ENUM translation of the new identity if it is or contains a number, for example E.164. This translation involves an ENUM entity 508.

In step G8, the O-CSCF 504 routes the message to a new I-CSCF 510 in another IMS network.

Reference will now be made to FIG. 5b, which shows a modification to the arrangement of FIG. 5a. Those elements which are the same as shown in FIG. 5a are marked with the same reference numbers.

Steps H1 to H4 correspond to steps G1 to G4 of FIG. 5a.

In step H5, the I-CSCF 502 routes the message to the O-CSCF 504.

Steps H6 and H7 correspond to steps G7 and G8 respectively.

Figure 5C:
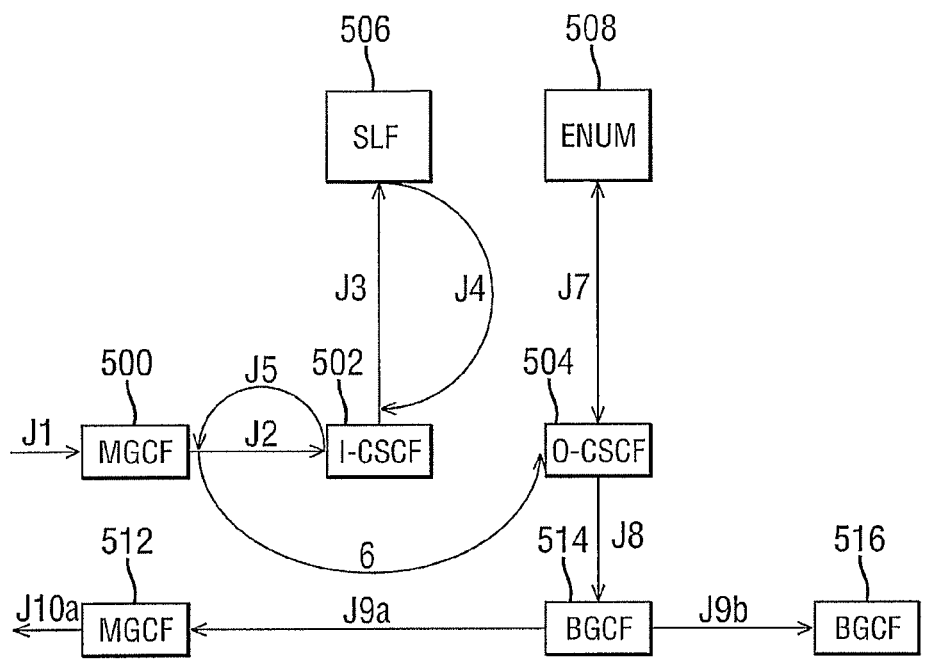
FIG. 5c shows a third arrangement where routing is done with an O-CSCF.
Figure 5D:
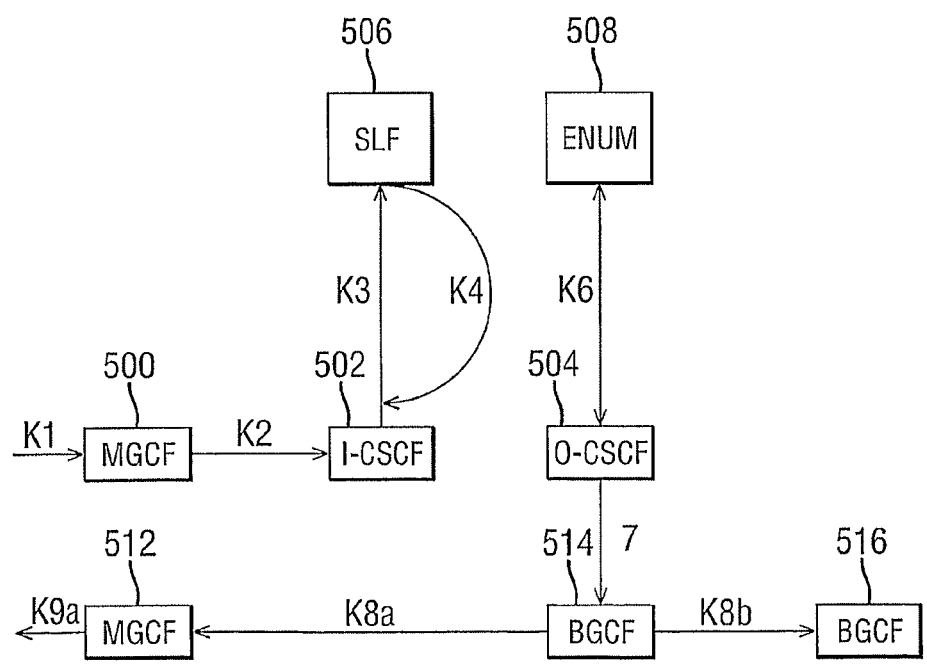
FIG. 5d shows a fourth arrangement where routing is done with an O-CSCF.

Reference is now made to FIGS. 5c and 5d which illustrate porting to a CS domain.

Steps J1 to J7 correspond to steps G1 to G7 respectively.

In step J8, because the O-CSCF 504 is not able to get a routable SIP URI, the O-CSCF 504 routes the message to a first BGCF 514.

The next step is then J9a or J9b which constitute normal routing steps. In particular, routing is either to a second BGCF 516 in step J9b or to a second MGCF 512 in step J9a.

FIG. 5d shows a modification to the arrangement of FIG. 5c.

Steps K1 to K6 are the same as steps H1 to H6 respectively of FIG. 5b and steps K7, K8a and K8b correspond to steps J8, J9a and J9b respectively.

In embodiments of the invention, the SLF/HSS may be queried by the I-CSCF during a registration or session set-up to get the name of the HSS containing the required subscriber specific data or get the name of the an adaptation function such as an application server, gateway or the like for further routing. The notation SLF/HSS means SLF, or HSS if SLF does not exist.

The adaptation functionality is arranged to communicate with the CSCF and performs protocol conversion between appropriate protocols and the IM subsystem control protocols, if required. The adaptation functionality is arranged to act as a gateway or server where requests with non-SIP schemes may be routed. The SLF/HSS may be arranged to handle the schemes and return a SIP routable address as the name of the adaptation functionality.

In embodiments of the present invention, the I-CSCF can send a query e.g. DX_SLF_QUERY or alike to the SLF/HSS and includes as a parameter the URI which is stated in the INVITE request. The SLF/HSS looks up in its database for the queried URI. The SLF answers with the HSS name in which the user's subscription data can be found or alternatively the SLF/HSS may answer with the name of the adaptation functionality where the request shall be routed.

The unknown status of a requested party can be determined in the SLF/HSS. The I-CSCF requests information on the user to be reached, identified by the URI included in the INVITE request and the SLF/HSS responds back to the I-CSCF with an indication that the user is unknown if it can not find the queried URI. The I-CSCF uses the indication that the user is unknown returned from the SLF/HSS to formulate the correct SIP message back towards the originating party to indicate that the user is unknown.

Communications between the CSCF and adaptation functionality may be in accordance with the SIP protocol. A single session control protocol may be applied to the interface between the CSCF and the adaptation functionality. This may be the SIP protocol or another protocol.

In embodiments of the invention, the routing of SIP signalling within the IMS may use URIs. The CSCFs and adaptation functionality may be identifiable using a valid SIP URL (host domain name or network address) on those interfaces supporting the SIP protocol. These SIP URLs may be used when identifying these nodes in header fields of messages.

Optionally SLF/HSS may return GW/S/AS address with a new identity. Thus SLF/HSS can be used as a portability network entity or device that returns a new identity with routing address.

A service URI is in the first place connected to a service. In the second place it may also be connected to an user (which has caused its creation) for example because of charging. A service URI may be used as an identity of the originator when originating a session/transaction on behalf of a service. A user may create a group identity:

Type I (Subscriber Initiated Group Session or Transaction)

In this type of group session and transaction normally everybody pays his own session to group session or transaction. The procedure is that the user reserves a group identity from the group server. The user sends the group identity to members of the group and then the members initiate the session or transaction to the group identity.

Type II (Group Server Initiated Group Session or Transaction)

In this type of group session and transaction normally the originator pays all sessions to group session or transaction. The procedure is that the user reserves a group identity from the group server. The user sends a list of members to the group server. The group server initiates the sessions or transactions to the group members.

Figure 6A:
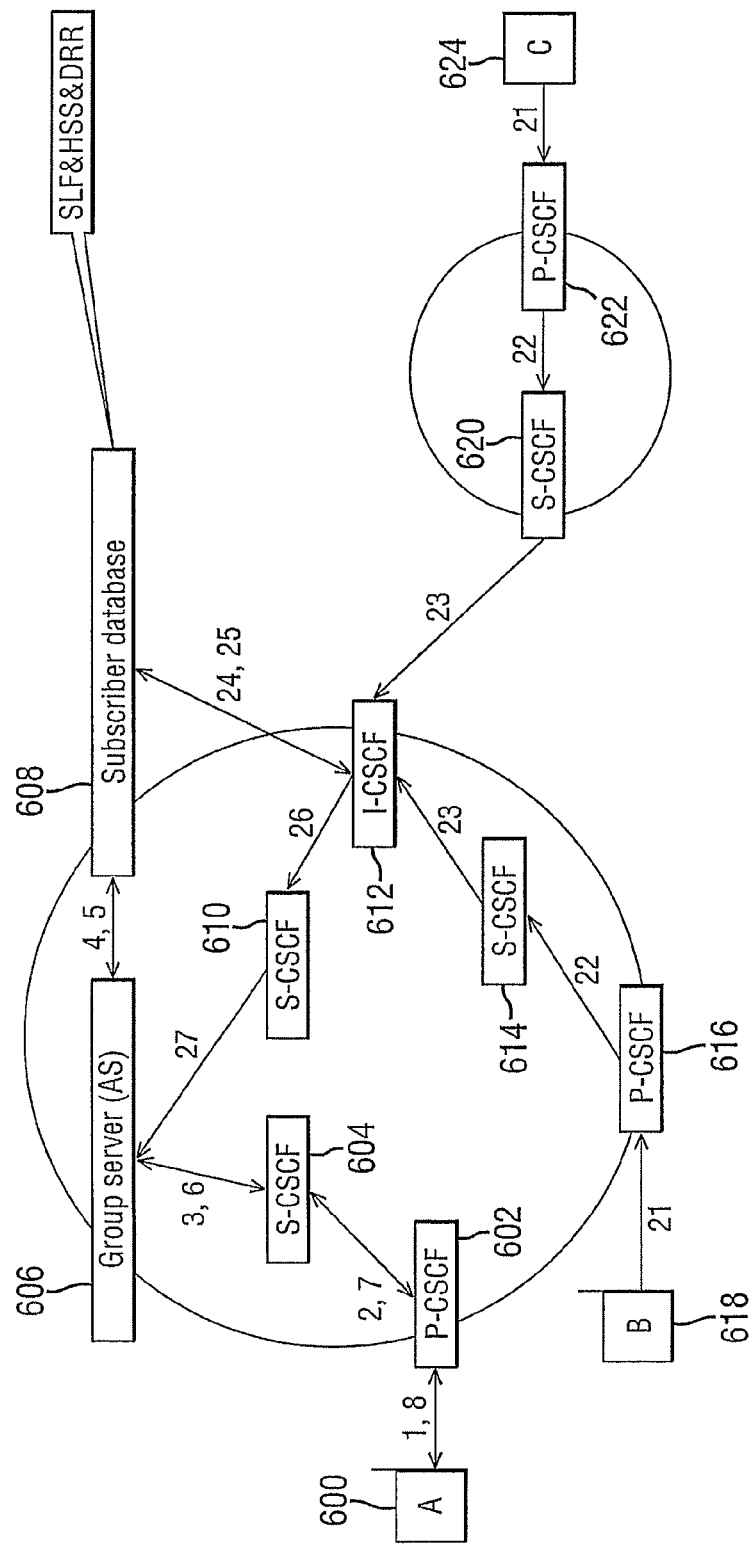
FIG. 6a shows a known arrangement for routing where a group server is an application server and there is a subscriber initiated group session.
Figure 6B:
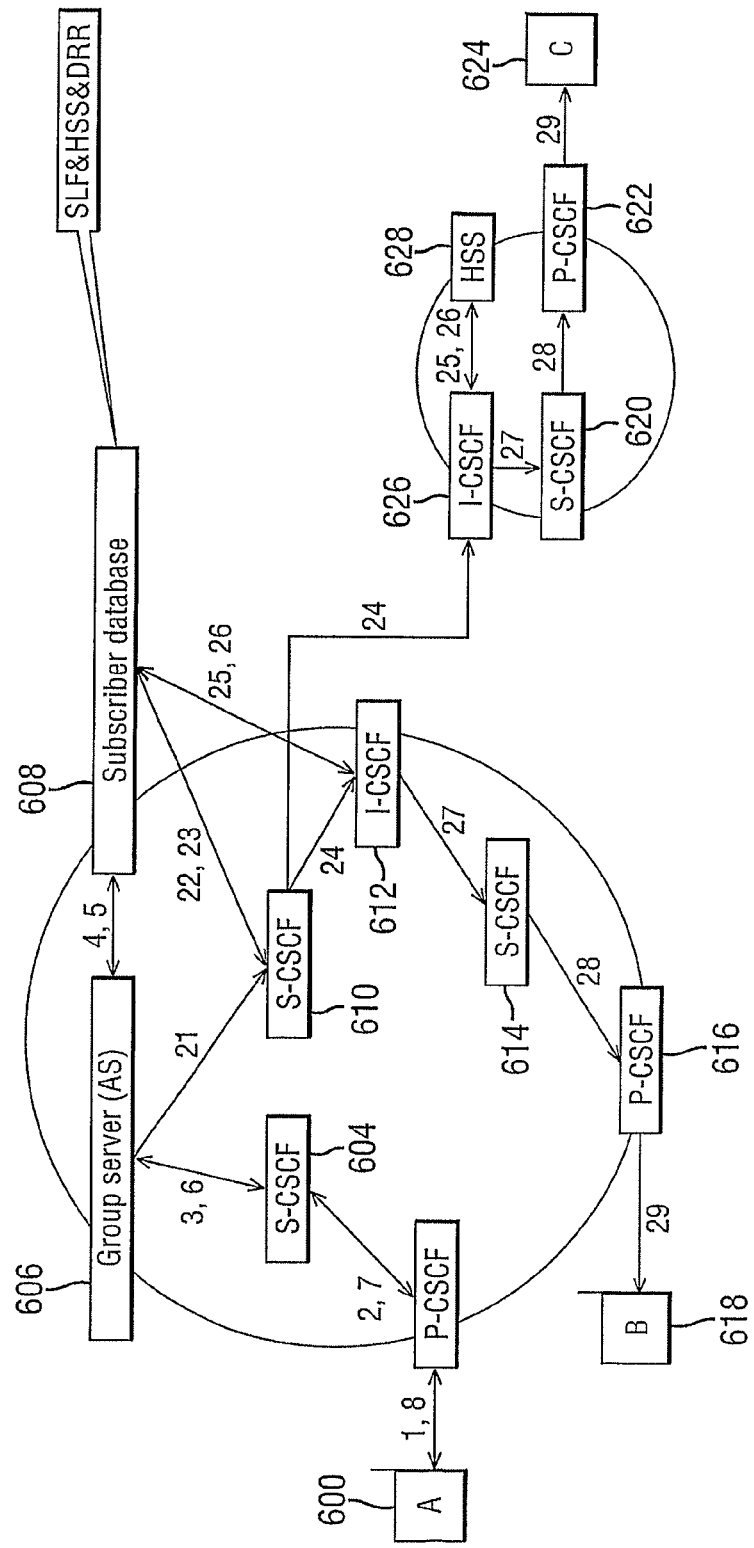
FIG. 6b shows a known arrangement where a group server is an application server and there is a group server initiated group session.
Figure 6C:
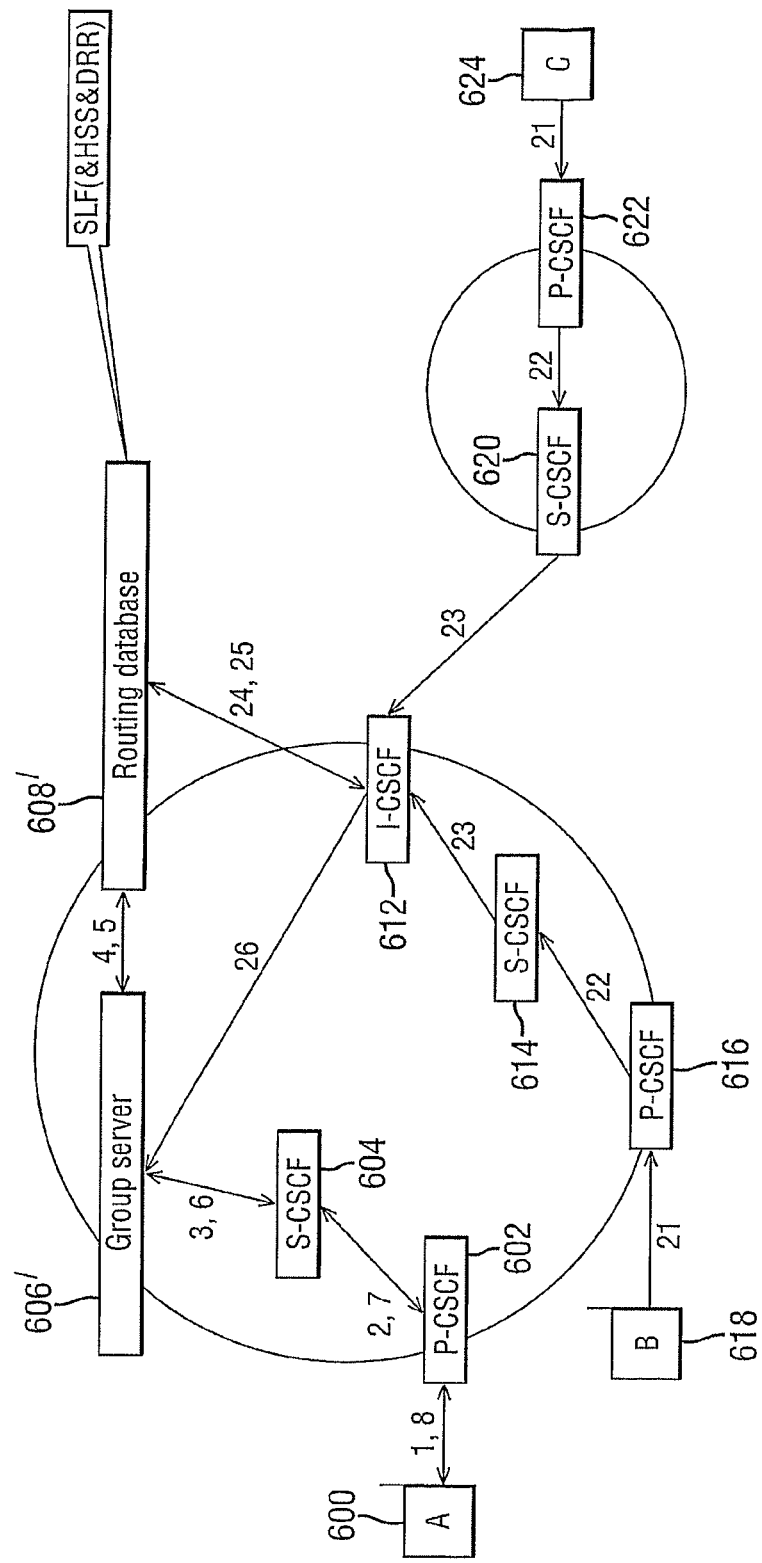
FIG. 6c shows a embodiment of the present invention where the group server is not an application server and there is a subscriber initiated group session.
Figure 6D:
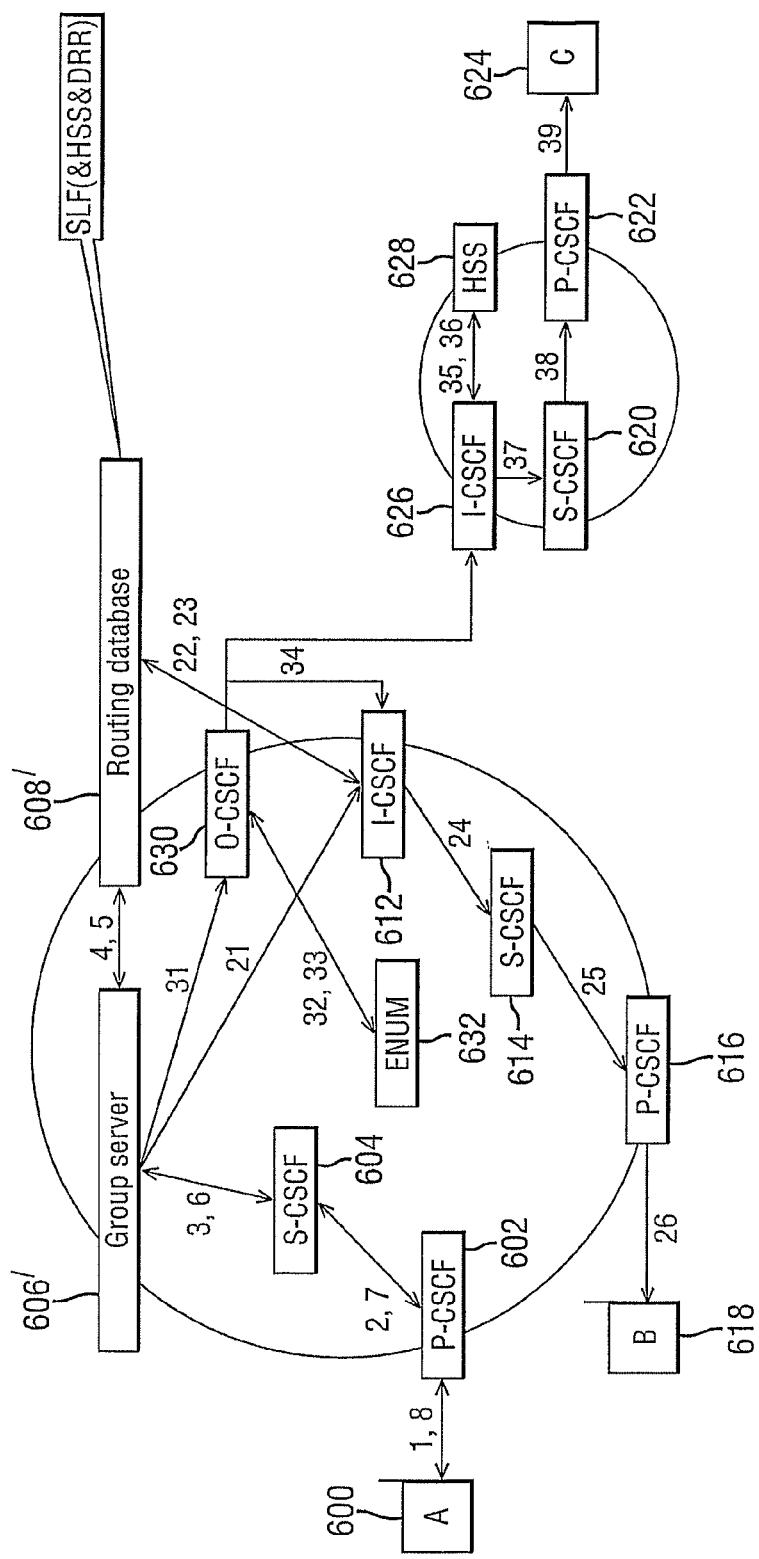
FIG. 6d shows an example embodying the present invention where the group server is not an application server and the group server initiates a group session.

This will now be described in more detail with reference to FIG. 6. FIGS. 6a and 6b describe known routing arrangements where the group server is an application server. These figures are included to aid the explanation of embodiments of the present invention. FIGS. 6c and 6d illustrate, embodiments of the present invention. In FIG. 6c, the routing from the I-CSCF to the group server is as in FIG. 2a. The routing from the group server to the I-CSCF or to the O-CSCF is like the routing in FIG. 3b.

Reference is made to FIG. 6a which shows a Type I case i.e. the subscriber initiated group session or transaction. The originator 600 sends in step 1 a message to the P-CSCF 602 which in step 2 contacts a corresponding S-CSCF 604. The S-CSCF contacts in step 3 the group server 606. In step 4 the group server contacts the subscription database 608 which can take any suitable form and may for example be an SLF, an HSS or a DRR (Dynamic Resource Register) or a database capable to store dynamic identities or alike. This effectively allows the originator 600 to reserve a group identity. The group identity is stored or activated in the subscriber database 608 by the group server 606 in step 4 and 5. The group server returns the group identity to the originator 600 via the S-CSCF 604 and the P-CSCF 602 in steps 6, 7 and 8 respectively. The originator 600 connects to the network which contains to the group server 606.

The originator 600 then sends the group identity to the other members of the group, that is entity B, referenced 618 and entity C referenced 624. This is not shown. The originator 600 and entity B 618 both connect to the network which contains the group server 606. Entity C 624 connects to a different network to that containing the group server 606.

The members of the group, that is entity B 618 and entity C 624 initiate a session on the basis of the group identity. In step 21, each of the members 618 and 624 contact a P-CSCF 616 and 622 respectively. The respective P-CSCF contacts in step 22 a respective S-CSCF 614 and 620. The respective S-CSCF contacts in step 23 a common I-CSCF 612. It should be appreciated that the P-CSCF and S-CSCF associated with entity B are in the same network as the group server while the P-CSCF and S-CSCF associated with entity C are in a different network to the group server.

The I-CSCF 612 interrogates the subscriber database 608 to obtain the relevant S-CSCF, this taking place in steps 24 and 25. The I-CSCF 612 then contacts the identified S-CSCF 610 in step 26. That S-CSCF then contacts the group server 606. In this way, the session is initiated.

Reference is now made to FIG. 6b which shows a type II case i.e. the group server initiated group session or transaction and the group server is an application server. The elements which are the same as shown in FIG. 6a are marked by the same reference numerals. The originator 600 reserves a group identity in steps 1 to 8, these steps being the same or similar to those described in relation to FIG. 6a. The originator then sends a list of members to the group server. This is not shown. The group server then initiates sessions to the members in steps 21 to 29 which will now be described. Again in this example the members are entity B 618 and entity C 624 with entity B being connected to the same network which contains the group server and entity C being connected to a different network.

Firstly, the group server 600 contacts in step 21 to a S-CSCF 610. The S-CSCF 610 contacts in step 22 to the subscriber database 608 to get the needed subscriber information e.g. the originating filter criteria associated to the group identity. This information is returned in step 23 to the S-CSCF 610. The S-CSCF 610 contacts the appropriate I-CSCF 612 and 626. The I-CSCF 612 for the entity B user interrogates the subscriber database in step 25 and receives information on the S-CSCF 614 to be used for the group member B, in step 26. Likewise the I-CSCF 626 for entity C 624, contacts a HSS 628 in step 25 which provided information in step 26 on the S-CSCF to be used.

The I-CSCFs 612 and 626 then contact the respective S-CSCF 614 and S-CSCF 620 for the respective members B and C 618 and 624. This happens in step 27. In step 28, the respective S-CSCFs 614 and 620 contact respective P-CSCFs 616 and 622 associated with the respective members B and C 618 and 624. The respective P-CSCFs 616 and 622 then contact in step 29 the members B and C 618 and 624 respectively. In this way, the group server is able to initiate a session.

Reference is now made to FIG. 6c which shows a type I case i.e. the subscriber initiated group session or transaction where the group server is not an application server. Instead, the group server may be a server. Again, those elements which are the same as shown in FIG. 6a are marked with the same reference numbers. In this arrangement, the group server is referenced by 606'. Instead of a subscriber database, there is a routing database 608'. The difference between 608 and 608' is the same as between 102 and 104 of FIG. 1 (normal subscriber DB) and 102 and 110 of FIG. 2a. The routing database can be provided by an SLF and/or HSS and/or DRR.

In steps 1 to 8, the originator 600 reserves a group identity. These steps are the same or similar to those described in relation to FIGS. 6a and 6b. However, it should be appreciated that steps 4 and 5 may be omitted in embodiments of the present invention. In this case the group server 606' may have the necessary group identity and not need to look it up from the routing database or store it into the routing database.

The originator 600 then sends the group identity to the members of the group. Again, this is not shown. Next, the members of the group 618 and 624 initiate a session to the group identity in steps 21 to 26. Steps 21 to 25 are as described in FIG. 6a except routing database 608' is used instead of subscriber database 608. In practice there may be little difference between a routing database and a subscriber database. However, a connection is made directly from the I-CSCF 612 to the group server 606' in step 26. This may be as discussed in relation to previous embodiments.

Reference is made to FIG. 6d which shows an example where the group server is not an application server and it is a type II case, i.e. the group server initiated group session or transaction. Again, those elements which are the same as in FIG. 6a, b, and c are referred to with the same reference numbers.

The originator 600 reserves a group identity in steps 1 to 8. Again, as with FIG. 6c, steps 4' and 5 may be omitted. The originator then sends a list of members to the group server 606'. These steps are not shown for clarity.

The group server then initiates sessions with the members. Steps 21 to 26 are an example where it is carried out with the identity of a member in the group and the identity is SIP URI. This allows members attached to the same network as the group server to be contacted to establish a session. This is illustrated by steps 21 to 26. In this, the group server 606' connects directly to the I-CSCF 612, and not via an S-CSCF. This is as discussed in relation to earlier embodiments. The I-CSCF 612 interrogates the routing database 608 in step 22 to receive routing information from the database in step 23. That routing information may be the S-CSCF to which the message from the I-CSCF 612 is to be routed. Based on that routing information, the I-CSCF 612 contacts the S-CSCF 614 associated with the user 618. This occurs in step 24. In step 25 the S-CSCF 614 contacts the P-CSCF 616 associated with the entity B 618. In step 26, the P-CSCF 616 contacts the entity B 618. In this way, a session is initiated.

The group server may alternatively or additionally initiate sessions to the member with a TEL URL of the own network. This allows members attached to the same network as the group server to be contacted to establish a session. In this step, the group server 606' contacts in step 31 an O-CSCF 630. In step 32, the O-CSCF 630 looks up the ENUM from a database 632. This occurs in step 32 with the reply being sent to the O-CSCF in step 33. In step 34, the O-CSCF 630 contacts the I-CSCF 612. Steps 22 to 26 already described are then carried out. In this way, the session can be established.

The group server can initiate a session alternatively or additionally with a foreign TEL URL, that is with a TEL URL of a different network. This allows members attached to a different network as the group server to be contacted to establish a session. In this, steps 31 to 34, already described are carried out. However this case, step 34 would allow the O-CSCF 630 to contact the I-CSCF 626 associated with the member C 624. That I-CSCF 626 and member C are part of and connected to respectively a different network to that containing the group server. In step 35 the I-CSCF obtains routing information for the subscriber 624 from the HSS 628. The information is returned in step 36. This information may identify the S-CSCF 620 to be used. The I-CSCF 626 then contacts the identified S-CSCF 620 in step 37. In step 38 the S-CSCF 620 contacts the respective P-CSCF 622. The P-CSCF 622 contacts member C in step 39. In this way, a session is established.

Alternatively or additionally, the group server can initiate a session with a member using a foreign SIP URI. In other words, the SIP URI of a different network is used. This allows members attached to a different network to the group server to be contacted to establish a session. This involves step 31 and then steps 34 to 39 already described. In other words, steps 32 and 33 are omitted.

In embodiments of the present invention the group server is not an application server so an ISC interface may not be used. In known arrangements, an ISC interface is bound with a S-CSCF and AS, that is there is an ISC interface between these entities. To route to an AS involves going via an ISC, that is S-CSCF to ISC to AS and vice versa. A filter criteria is used at an S-CSCF to select and AS. In this embodiment, the aim of the group server is to avoid the restriction that the routing to an AS must always go from the S-CSCF via the ISC interface.

Figure 7A:
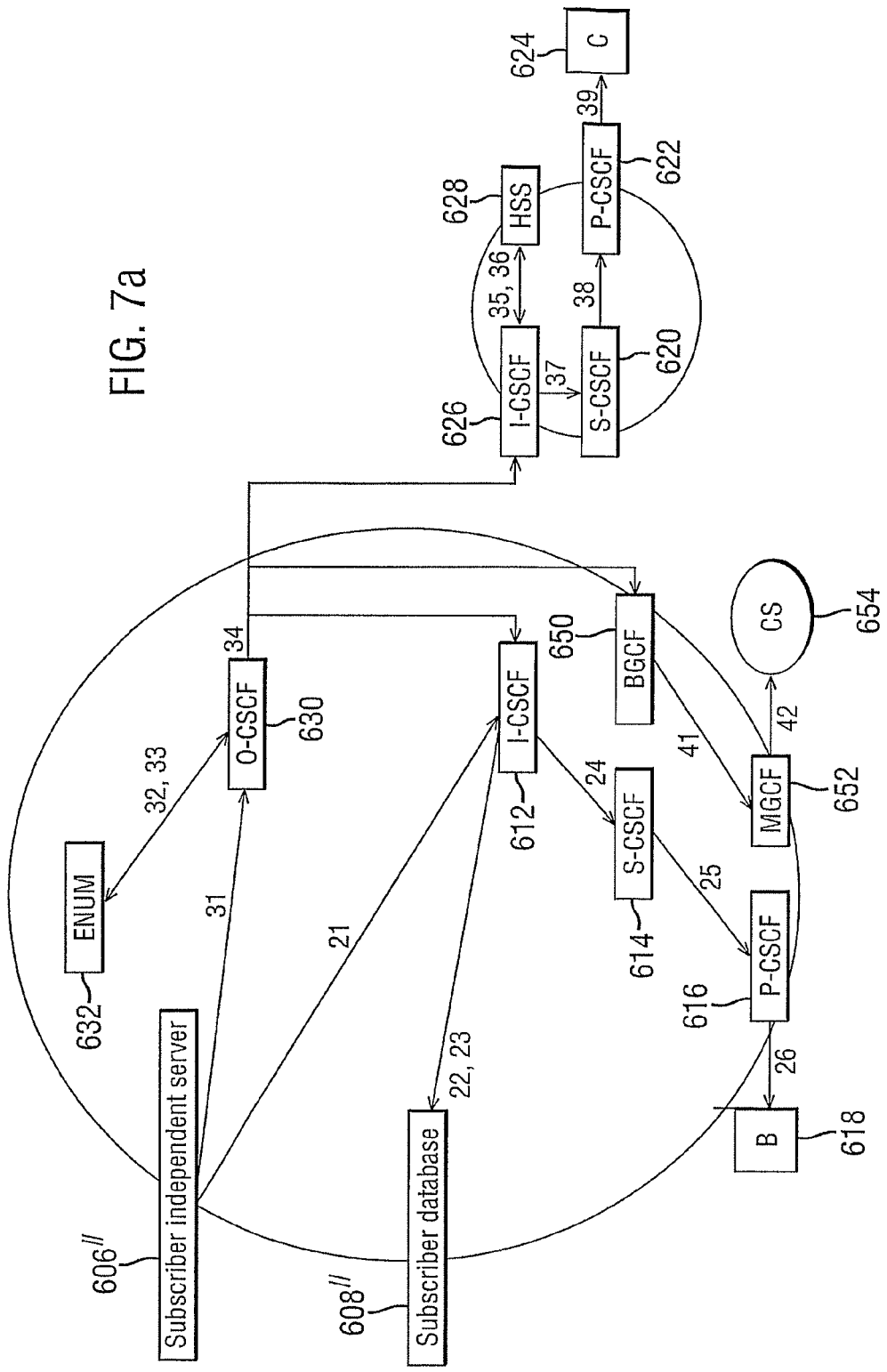
FIG. 7a shows an arrangement where a server offers subscriber independent services, in the originating case.

The point of the group server arrangement described in relation to FIG. 6c and d and FIGS. 7a and b, is:
a) Routing to group server is allowed from S-CSCF optionally with ISC and also via other interfaces in addition to the optional ISC (e.g. via normal SIP).
b) Routing to group server is allowed also from other elements in addition to the optional routing from S-CSCF in terminating cases.
c) Routing from group server is allowed also to other elements in addition to the optional routing to S-CSCF in originating cases.

The group server is seen as an entry point to another network (which can be regarded as the network offering group sessions).

The group server can be regarded as being an I-CSCF of another network. It is possible in some embodiments of the present invention, that a group server can consist of application server and non application server parts. Reserving group entity is routed as to an application server whilst routing to the group identity is as routing to a server. Both routings of FIGS. 1 and 2a are valid to the same server e.g. application server. This has the advantage that routing becomes simple. No S-CSCF involvement is required in cases where the group server is originator of the session. No. HSS involvement is necessary. The SLF can offer addresses to the group server in the terminating case. SLF may contain wildcard entries that are associated to the routing to a certain group server or servers. The group server(s) give(s) out i.e. deliver(s) only group addresses that match one of the wildcard entries in the SLF. This way group identities need no to be stored as dynamic identities to subscriber database (e.g. HSS, DRR or alike). As an example *.john.doe@operator.net may be a wildcard entry in SLF (or in HSS if there is no SLF). When John Doe want to reserve a group identity, the group server gives to John Doe only group identities containing his own identity e.g. fishing-friends.john.doe@operator.net and family.john.doe@operator.net.

Reference is now made to FIG. 7a which shows a server 606" offering subscriber independent services. FIG. 7a shows the originating case where routing is from the subscriber independent server. Those elements which were the same as shown in FIG. 6 are referred to as the same reference number. The same step number is used for those steps which correspond to those shown in FIG. 6.

In the case where the users own SIP URI is used, steps 31, 34 and 22 to 26 already described in relation to FIG. 6 are carried out in that order. In this case, instead of the group server or application server shown in FIG. 6, there is a subscriber independent server 606". As in FIGS. 6a and b, there is a subscriber database 608. In step 34, the O-CSCF contacts the I-CSCF 612 in the same network as contains the server.

In some embodiments of the present invention, this can be optimised and steps 21 to 26 can be carried out when the own SIP URI is used, leaving out steps 31 and 34.

If the network's own TEL URL is used, then steps 31 to 34 and steps 22 to 26 are carried out in that order. In step 34, the O-CSCF contacts the I-CSCF 612 in the same network as contains the server.

If the ENUM translation fails, routing can still take place with the TEL URL. In this case, steps 31 to 34 and 41 to 42 are used. In step 34, a BGCF 650 is contacted by the O-CSCF 630. The BGCF 650 contacts an MGCF 652 in step 41 which in turn connects in step 42 to the circuit switched domain 654.

Routing can be done with a TEL URL of a foreign or different network. This involves steps 31 to 33 and 34 to 39 as described previously. In steps 32 ENUM query is used to get information in step 33 to resolve the TEL URL into SIP URI to be used for routing. In step 34, the O-CSCF connects to the I-CSCF 626 of the different network to that containing the server 606".

If routing is carried out with a SIP URI from a different network, then steps 31 and 34 to 39 are carried out, in that order. In step 34, the O-CSCF connects to the I-CSCF 626 of the different network to that containing the server 606".

It should be appreciated that in some embodiments, one or more of these routing methods can be carried out. For example, routing to different users can be carried out on this basis.

Figure 7B:
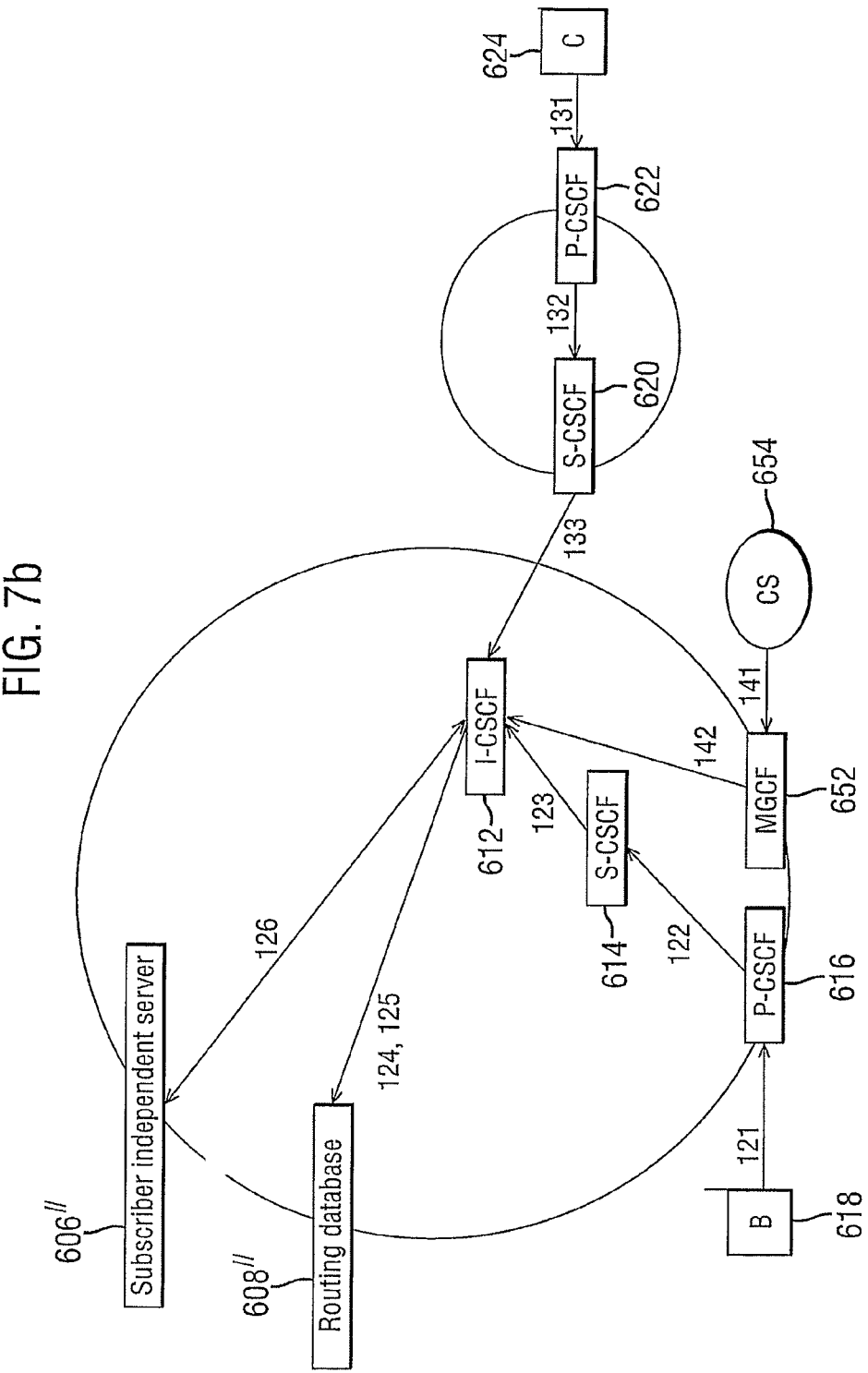
FIG. 7b illustrates where the server offers subscriber independent services in the terminating case.
Figure 8A:
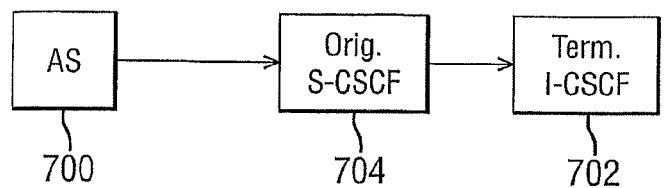
FIG. 8a to c show three routing scenarios for requests that originate from a public service identity PSI, embodying the invention.
Figure 8B:
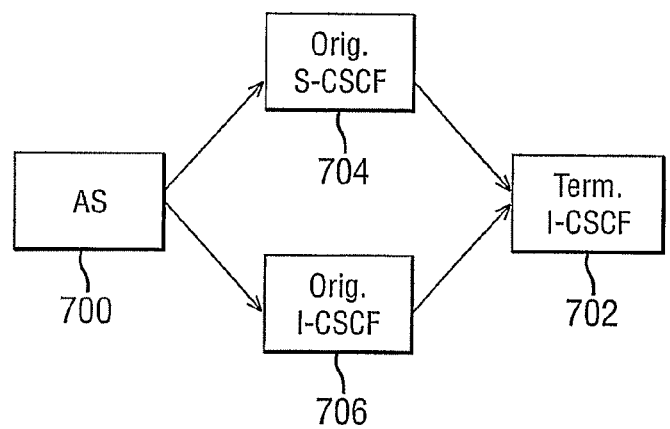
Figure 8C:
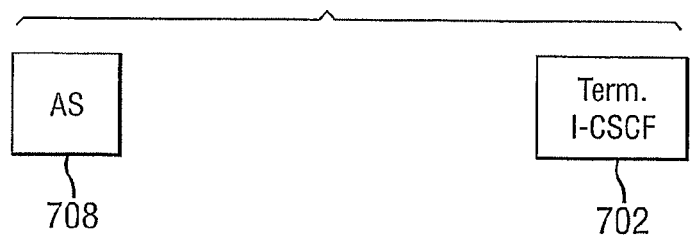

Reference is now made to FIG. 7b which shows the terminating case. Again, those elements which are the same as shown in FIGS. 6 and 7a are referred to by the same reference number.

Where routing to the subscriber independent server 606" is from the same network as the server, the following steps are carried out in this order. In step 121, the user 618 contacts its associated P-CSCF 616 which in turn contacts the appropriate S-CSCF 614 in step 122. In step 123, the S-CSCF 614 contacts the I-CSCF 612. In step 124, the I-CSCF 612 contacts the routing database which provides routing information in step 125 to the I-CSCF 612 identifying the server 606". In step 126, the I-CSCF contacts the subscriber independent server 606".

In the terminating case where the user is in a different network to the subscriber independent server 606", the following steps are carried out: the user 624 sends contacts the P-CSCF 622 in step 131. The P-CSCF 622 contacts the associated S-CSCF 620 in step 132. These elements are outside the network containing the server 606".

In step 133, the I-CSCF 612, in the same network as the server 606" is contacted by the S-CSCF 620. Steps 124 to 126 are then performed, as already described.

Where the user is in a circuit switched domain 654, the circuit switched domain 654 contacts the MGCF 652 in step 141. In step 142, the MGCF 652 contacts the I-CSCF 612. Steps 124 and 126 are then carried out as already described.

If a server handles all needed identities in its own database or databases, it is not dependent on the HSS or any other subscriber database. For this reason, it can be referred to as a subscriber independent server. In preferred embodiments of the present invention, the subscriber independent server may not be an application server so an ISC interface may not be used. It can be regarded as being similar to an entry point to another network and can be looked on by the network of which it is a part as if it were a I-CSCF of another network. Subscriber independent server may be located physically also outside the network. All the required data concerning the subscribers is located in the server itself or in its own database.

Embodiments of the present invention have the advantage that routing becomes simple. No S-CSCF involvement is required in the cases where the group server is the originator of a session or a transaction. No HSS involvement is necessary. For example, the SLF can offer an address to the server in the terminating case. All data concerning the subscribers can be in the database of the subscriber independent server or in a database or databases connected to the server. The Sh i.e. the interface between HSS and AS is not used. Sh interface may be used to get the S-CSCF address from the HSS in the case when an AS originates a session or transaction. If no S-CSCF is involved in the routing there is no need to ask HSS the S-CSCF address and thus no Sh interface is necessary. Embodiments of the present invention have the advantage that third party operators can easily offer originating and terminating services and there is no need to insert anything into the HSS. The only change which may be required is to insert a domain name address pointing to the server in the SLF. For example news.3-party-operators.operator.net may be inserted to the SLF and connected to the routing to a subscriber independent server, located e.g. in the address "news-host.newscompany.3-party-operators.operator.net" i.e. in the subdomain 3-party-operators.operator.net. As well the domain name may be completely different from the operator's own domain name. For example the entry news.company.com may be inserted to the SLF and associated to the routing to a subscriber independent server e.g. a news server, of the company.com. In this way a third party operator may be able to offer services to IMS subscribers without having to have its own IMS network. Thus embodiments of the invention, all needed data relating to the subscribers may be located in the server itself or in its own database or databases or in databases operated by the same operator as the operator of the server. This makes it possible for the third party to offer services from its own server and to utilise the main (that is a different) operator's IMS or similar network for routing. Subscribers of the subscriber independent server may or may not also be IMS subscribers. The third party operator is able to run its server independently of the main operator.

In one modification to the embodiments described, the outbound proxy is implemented by a S-CSCF so that the originating AS sends a signal to the S-CSCF to act as an outbound proxy instead of a S-CSCF.

The signal sent by the AS is in the initial request a) embedded in the address of S-CSCF e.g. it may be a parameter, a port number, a character or bit string in the user part of the address and/or b) as a separate signal from the address of S-CSCF e.g. in a separate header or in the payload.

Because the outbound proxy is only a subset of functionalities of S-CSCF it is simple to implement. With the same signalling mechanism, outbound proxy can be implemented with I-CSCF too, or with whichever CSCF.

The Release 6 version of the third generation partnership standard 23.228, which is hereby incorporated by reference, introduces the concept of a Public Service Identity (PSI). The arrangement discussed below uses the S-CSCF arranged to provide either a S-CSCF functionality or a outbound proxy functionality.

With the introduction of standardized presence, messaging, conferencing, and group service capabilities in IM CN subsystem, there is a need for Public Service Identities (PSIs). These identities are different from the Public User Identities in the respect that they identify services, which are hosted by application servers. In particular, Public Service Identities are used to identify groups. For example a chat-type service may use a Public Service Identity (e.g. sip:chatlist_X@example.com) to which the users establish a session to be able to send and receive messages from other session participants.

Public Service Identities take the form of a SIP URL as defined in RFC 3261[12] and RFC 2396[13] or the "tel:"-URL format as defined in RFC 2806[15]. These standards are hereby incorporated by reference and are IETF standards.

The IM CN subsystem provides the capability for users to create, manage, and use Public Service Identities under control of AS. It is possible to create statically and dynamically a Public Service Identity. Each Public Service Identity is hosted by an application server, which executes the service specific logic as identified by the Public Service Identity. The IM CN Subsystem provides a capability of routing IMS messages using Public Service Identity.

The routing of the AS originated sessions/transactions with Public Service Identity is not clear in the current proposals and the arrangements described below addresses this.

Up until now only the routing towards a PSI has been described, i.e. requests that terminate at the AS that provides the service. Embodiments of the present invention discuss different possibilities for routing of requests that originate from a PSI.

Requests originating from a PSI are required e.g. when a Conference AS invites a user to a conference (dial-out). As this example shows, the progress of the conferencing work in CN1 is strongly related to the PSI routing procedures.

For routing of requests that originate from a PSI, the following possible routing scenarios can be used:

a). Request always routed via a S-CSCF in the originating home network

In this case the AS 700 always has to route via the S-CSCF 704 of its home network first.

This can be achieved by placing a so-called pre-loaded route header into the request (standard SIP procedure). The routing is then from the S-CSCF 704 to the terminating I-CSCF 702, b) Request always requires routing via any CSCF in the originating network Here the AS routes the initial request to either the I-CSCF 706 or the S-CSCF 704 of the home operator first. The particular CSCF can be determined either dynamically (e.g. over the Sh interface) or due to operators policy.

c) Request always routed directly to the destination network

The AS 700 in this scenario routes directly to the terminating I-CSCF 702, without any involvement of a CSCF in the originating network. This is also inline with the routing procedures as described in SIP.

d) Request routed due to operator decision

Due to the possibility of having a pre-loaded route, it is not required to standardize one of the above scenarios as the only valid one for IMS—the routing behavior of the AS can be determined by operator based on the policy of the home network.

Based on the provided service, an AS may or may not support specific routing functionalities. SIP provides the possibility that an entity is only able to route to a dedicated next hop, the so-called Outbound Proxy. If an AS is not able to e.g. resolve the address of the terminating I-CSCF, it needs to forward the request first to an entity that is capable of routing the request towards the terminating network.

This especially might be the case when the terminating party is indicated by a tel URL. In order to resolve a tel URL the AS could route the request first to the S-CSCF, which is able to resolve tel URLs.

On the other hand it is very likely that many application servers will be able to perform SIP routing procedures, DNS.

The functionality of the S-CSCF may need to be adjusted in order to provide the necessary routing mechanisms for AS's; the S-CSCF should perform only its routing capabilities (and not e.g. the filtering capabilities), when it detects that an incoming originating request indicates a PSI as the originator.

Depending on the nature of services some charging support can already be provided within the S-CSCF. However, the charging for specific services in IMS is not performed by the CSCFs, as they are designed to be service agnostic. If the charging support provided by the S-CSCF is not enough the AS can provide more information for charging purposes.

Nevertheless, in the given example for a dial-out conference, the invitation will also involve a media session between the AS and the called user. In this case the generation of charging information for the session—based on the SDP in the INVITE message—could be performed by the S-CSCF.

It has to be noted, that in this case, the S-CSCF would
a) need information about the user, to whom the PSI relates to (e.g. conference creator)—the PSI itself does not include any hint for the user who has to be charged;
b) not have any control over the media session itself (as e.g. the P-CSCF/PCF has via the Go interface).

The operator might want to collect certain data from all calls that traverse its network. Such functionality can be performed by e.g. an I-CSCF, in order not to use too much of the resources of the S-CSCFs.

As shown above, there might be cases where an operator wants to route PSI originated calls to a CSCF in its own network first, although SIP allows that the AS resolves the terminating I-CSCF and routes to it directly.

It is also clear, that the routing behaviour may be different for the individual cases which calls for a certain level of flexibility in routing:

a) the operator might want to force all AS's to route PSI originated calls over one or more specific entities in its network (strict policy);
b) the operator might want to force only certain AS's to route PSI originated calls over one or more specific entities in its network;
c) although the operator does not apply any routing policy, the AS might not be able to perform SIP routing procedures and therefore needs to contact the S-CSCF first;
d) although the operator does not apply any routing policy, the AS might need to contact the S-CSCF in certain cases, e.g. when ENUM cannot be performed by the AS (case-by-case routing);

Allowing such a flexible approach would on the other hand would deviate from some principles within IM CN Subsystem as it currently is, e.g.

a) if the operator applies a lose policy, the AS could route directly to entities outside the home network, although there is no interface defined for such purpose;
b) if the operator applies a lose policy, the AS could route directly to the BGCF (e.g. when inviting another user to a conference);
c) if the operator does not force the AS to route over the S-CSCF, the S-CSCF might not get aware of the media streams that are originating from/terminating at the home network;
d) the routing of calls originating from an AS/PSI would not be strictly defined within the home network and based on the individual case and operator policy, the routing behavior will be different.

Figure 9:
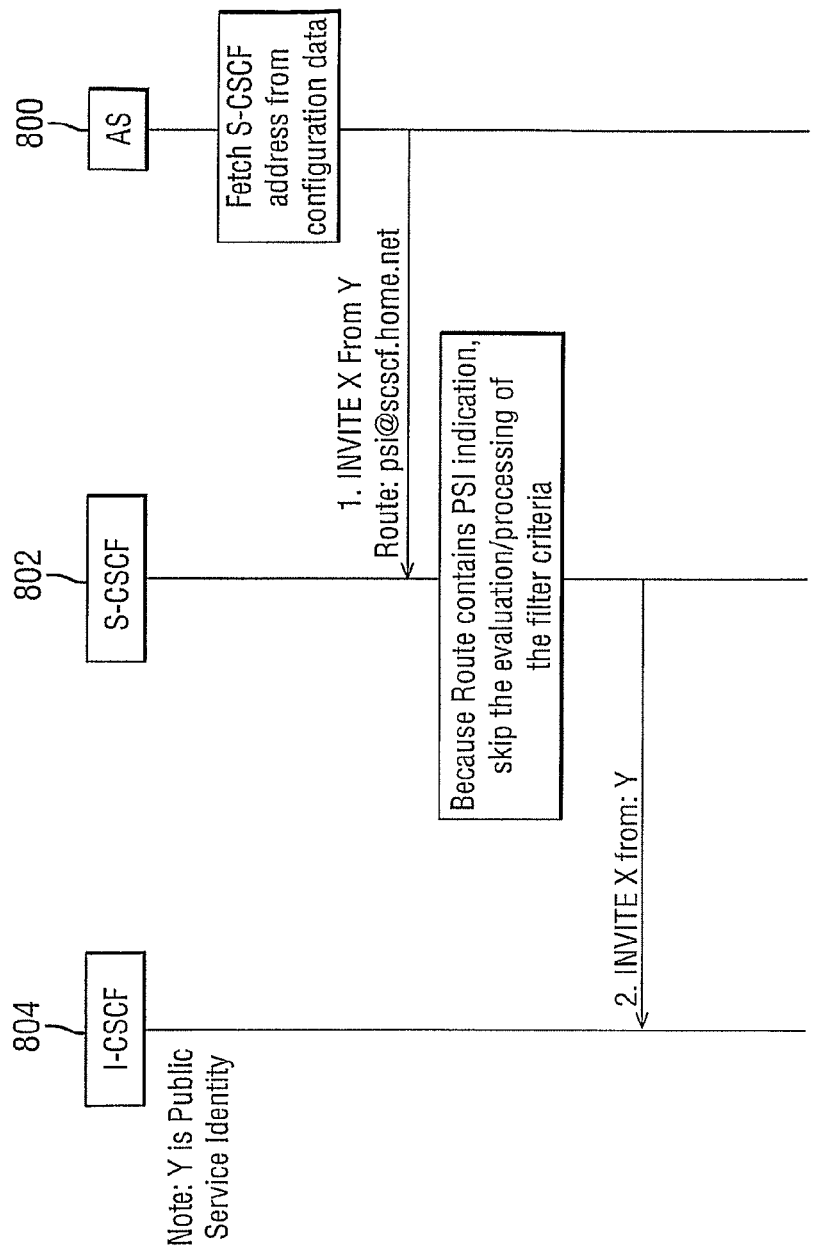
FIG. 9 shows the flow of messages where the PSI is the originator, embodying the invention.

If the sessions/transactions are routed via the S-CSCF, the first problem is what S-CSCF should be used and second how to skip over the filter criteria handling. This is illustrated by the arrangement shown in FIG. 9.

The AS 800 fetches the S-CSCF address from configuration data. The AS sends a first message to the identified S-CSCF 802: INVITE X from Y (Y is the PSI identity) Route: psiscsf.home.net.

Because the Route contains the PSI indication, the S-CSCF 902 skips the evaluation/processing of the filter criteria. The S-CSCF 802 then send INVITE X From: Y message to the I-CSCF 804.

Embodiments of the present invention have been described in relation to application servers. However it should be appreciated that embodiments of the invention can also be used with gateways or any other entity especially with an entity having the same or similar relationship as the application servers to other entities illustrated in the Figures and/or as described.

It should be appreciated that a number of different features have been described and that is possible that some embodiments of the invention can combine different ones of these features.

It should be appreciated that in embodiments of the present invention, IMS is access independent. This means that any suitable access method such as WLAN (wireless local area network) or the like can be used. IMS and PRES schemes offer a way to specify services without specifying the protocol to be used to get services. These protocol independent schemes provide a way to identify services.

The invention claimed is:

1. An apparatus, comprising:
   at least one processor; and
   at least one memory embodying computer program code, the at least one processor, the at least one memory, and the computer program code configured to cause the apparatus to at least:
   perform a call session control function in accordance with a session initiation protocol, the call session control function having a first mode to provide a serving call session control function, and a second mode to provide an outbound proxy function to cause routing of an application server originated session to another network,
   wherein at least one of the first mode and the second mode is selected by the call session control function in response to information of a public service identity in an initial session initiation protocol request received by the apparatus from the application server.

2. The apparatus of claim 1, wherein the at least one of the first mode and the second mode are selected in response an address of the subscriber call session control function.

3. The apparatus of claim 2, wherein the information of the public service identity comprises at least one of a parameter, a port number, a character, and a bit string in a user part of the address.

4. The apparatus of claim 2, wherein the apparatus is further configured to at least provide an interrogating call state control function in accordance with the session initiation protocol.

5. A method, comprising:
   performing a call session control function in accordance with a session initiation protocol, the call session control function having a first mode to provide a serving call session control function, and a second mode to provide an outbound proxy function to cause routing of an application server originated session to another network,
   wherein at least one of the first mode and the second mode is selected by the call session control function in response to information of a public service identity in an initial session initiation protocol request received by the call session control function from the application server.

6. The method of claim 5, wherein the at least one of the first mode and the second mode are selected in response to an address of the subscriber call session control function.

7. The method of claim 6, wherein the information of the public service identity comprises at least one of a parameter, a port number, a character, and a bit string in a user part of the address.

8. The method of claim 6, further comprising:
   providing an interrogating call state control function in accordance with the session initiation protocol.

9. A non-transitory computer-readable medium encoded with instructions that, when executed by at least one processor, cause operations comprising:
   performing a call session control function in accordance with a session initiation protocol, the call session control function having a first mode to provide a serving call session control function, and a second mode to provide an outbound proxy function to cause routing of an application server originated session to another network,
   wherein at least one of the first mode and the second mode is selected by the call session control function in response to information of a public service identity in an initial session initiation protocol request received by the call session control function from the application server.

10. The non-transitory computer readable medium of claim 9, wherein the at least one of the first mode and the second mode are selected in response to an address of the subscriber call session control function.

11. The non-transitory computer readable medium of claim 10, wherein the information of the public service identity comprises at least one of a parameter, a port number, a character, and a bit string in a user part of the address.

12. The non-transitory computer readable medium of claim 10, further comprising:
   performing an interrogating call state control function in accordance with the session initiation protocol.

* * * * *